(12) United States Patent  
Ogilvy

(10) Patent No.: US 8,543,500 B2  
(45) Date of Patent: Sep. 24, 2013

(54) TRANSACTION PROCESSING METHOD, APPARATUS AND SYSTEM

(76) Inventor: Ian Charles Ogilvy, Rozelle (AU)

( * ) Notice: Subject to any disclaimer, the term of this patent is extended or adjusted under 35 U.S.C. 154(b) by 575 days.

(21) Appl. No.: 11/630,553

(22) PCT Filed: Jun. 24, 2005

(86) PCT No.: PCT/AU2005/000902
§ 371 (c)(1),
(2), (4) Date: May 30, 2008

(87) PCT Pub. No.: WO2006/000021
PCT Pub. Date: Jan. 5, 2006

(65) Prior Publication Data
US 2009/0099961 A1   Apr. 16, 2009

(30) Foreign Application Priority Data

Jun. 25, 2004 (AU) ................................ 2004903470
Jul. 19, 2004 (AU) ................................ 2004903997
Aug. 30, 2004 (AU) ................................ 2004904941
Mar. 14, 2005 (AU) ................................ 2005901230

(51) Int. Cl.
*G06Q 40/00*   (2012.01)

(52) U.S. Cl.
USPC .................... 705/40; 705/41; 705/35; 705/38

(58) Field of Classification Search
USPC ......................................................... 705/40
See application file for complete search history.

(56) References Cited

U.S. PATENT DOCUMENTS 5,440,634 A    8/1995 Jones et al.
2001/0039535 A1  11/2001 Tsiounis et al.

(Continued)

FOREIGN PATENT DOCUMENTS

EP   1 107 198 A2   6/2001
EP   1 150 262      10/2001

(Continued)

OTHER PUBLICATIONS

Patent Cooperation Treaty, PCT/CA01/00480 (WO 01/78483), Solution International SRL, International Publication Date: Oct. 25, 2001.*

(Continued)

*Primary Examiner* — Hai Tran
(74) *Attorney, Agent, or Firm* — Merchant & Gould P.C.

(57) ABSTRACT

The present invention relates to transaction processing, for processing of payments between payer's (usually individual payers) and payee's (usually merchants. Conventionally, a payment transaction involves a user's account details being provided to a merchant device, e.g. by swiping a card in the card swipe of the merchant device. The merchant device then prepares a transaction message including information such as the user's account ID, merchant ID and payment information and forwards that message to a transaction processing system, which may comprise a transaction acquirer and an issuing bank. The transaction processing system approves the payment and returns confirmation to the merchant. In the present invention a device associated with the payer, which in a preferred embodiment is a suitably adapted mobile telephone, becomes involved in the payment transaction process. At one level, the transaction processing system requests from the payer electronic device confirmation that the transaction should proceed and the payer keys in an appropriate PIN to authorize the transaction. At another level, all the transaction processing information is provided from the payer electronic device to the transaction processing system and the transaction processing system or the payer electronic device then confirm that the transaction is authorized to the merchant device. This takes the burden of transaction processing off the merchant and also increases the security of the transaction as the payer is in control. In a further embodiment, the payer electronic device may also upload listings of products and select products at the same time as paying for them, the payee (merchant) being advised of the selected product.

78 Claims, 14 Drawing Sheets

(56) References Cited

U.S. PATENT DOCUMENTS

| | | | |
|---|---|---|---|
| 2002/0007294 A1 | 1/2002 | Bradbury et al. | |
| 2002/0023027 A1* | 2/2002 | Simonds | 705/26 |
| 2002/0025796 A1 | 2/2002 | Taylor et al. | |
| 2002/0065839 A1* | 5/2002 | McCulloch | 707/200 |
| 2003/0187784 A1 | 10/2003 | Maritzen et al. | |
| 2004/0044621 A1 | 3/2004 | Huang et al. | |
| 2004/0107146 A1 | 6/2004 | Alfano | |
| 2004/0122685 A1* | 6/2004 | Bunce | 705/1 |

FOREIGN PATENT DOCUMENTS

| | | |
|---|---|---|
| EP | 1 213 689 A2 | 6/2002 |
| WO | WO 01/71627 A2 | 9/2001 |
| WO | WO 01/78483 | 10/2001 |
| WO | WO0178483 * | 10/2001 |
| WO | WO 02/01515 | 1/2002 |
| WO | WO 02/086829 | 10/2002 |

OTHER PUBLICATIONS

Australian Patent Examination Report No. 1 for corresponding Australian Patent Application No. 2011253607 mailed Aug. 14, 2012.
European Official Letter for corresponding European Patent Application No. 05754386.0 mailed Jul. 24, 2012.
New Zealand Examination Report for corresponding New Zealand Patent Application No. 594249 mailed Jul. 29, 2011.

* cited by examiner

TRANSACTION PROCESSING METHOD, APPARATUS AND SYSTEM

FIELD OF THE INVENTION

The present invention relates generally to transaction processing methods and systems and more particularly, but not exclusively, to transaction processing systems for facilitating payments at point of sale or on-line between payers (who may be members of the general public) and payees (who will usually be merchants).

BACKGROUND OF THE INVENTION

Payment for a product or a service is often made in an electronic manner. For example, the payment may be made using a credit or charge card and a financial institution such as a bank may initiate transfer of the payment, either directly or via one or more intermediary institutions, to an account of a payee after a payer has authorised the transfer. Authorisation of the transfer may, for example, involve providing the payee with the credit card or charge card and signing an invoice. The payee then compares the payer's signatures on the invoice with the signature on the card and if he is satisfied he accepts the authorisation of the payment.

Various other methods have been proposed to have the payer "sign" the transaction to verify a payment, including, for example, using a security pin number.

However, there are still substantial security risks that need to be considered. For example, payment using a credit or charge card usually requires to give the card to the payee for a short period of time until the invoice is issued and signed. Magnetic strip cards are easily copied on relatively inexpensive equipment and the copied cards may be used for fraudulent transactions. Electronic payment systems that involve the Internet have related security problems. There is a general need for a payment system that offers improved security and convenience.

Further, the general paradigm conventionally associated with processing payment transactions is that the transaction processing communications (messages including payment information, such as account ID of payer, merchant ID, transaction amount, etc.) are processed between the payee or merchant device and a transaction processing system (usually a transaction acquirer and one or more issuing banks). The payer has little to do with the transaction processing other than to provide their account details (which, as discussed above, are then open to being obtained for fraudulent use). No one has suggested an alternative system to the conventional merchant device/transaction processing system arrangement.

SUMMARY OF THE INVENTION

In accordance with a first aspect, the present invention provides method of making a payment, comprising the steps of:

providing information associated with a payer, the information being provided in a manner so that a payee can access the information, receiving information about the payment by a payer electronic device associated with the payer, and giving instructions for making the payment using the electronic device associated with the payer.

Members of the public generally nowadays possess one or more electronic devices. For example, the mobile telephone is ubiquitous. In one embodiment, the method involves using such a ubiquitous electronic device associated with the payer to give instructions for making the payment. The electronic device may be a dedicated payer electronic device or may be a modified mobile telephone.

Every payer may therefore have an electronic device associated with them which they can use to provide instructions for making payment. In one embodiment, the instructions for making payment may be a mere confirmation for a transaction processing system that payment should proceed. Nevertheless, this adds an extra layer of security (requiring information from an electronic device associated with the payer) that is absent with present transactions.

The payment may be a card-present payment, for example where the payer attends at a point of sale ("POS"). The transaction may be card-not-present, for example an Internet payment. Where the payment is an on-line payment, such as an Internet payment, the electronic device is not the computer that the payer is using to access a merchant's website, but is a separate electronic device.

In one embodiment, the payer electronic device is arranged (by, for example, including an appropriate software application) to recognise payment information. In one embodiment, software enabling recognition of payment information in a similar way to present transaction processing software may be available, so that the payer electronic device may formulate messages including payment information and transmit those messages to a transaction system (for example for use by transaction acquirers and issuing banks).

In one embodiment, the payer electronic device may include security measures to add to the security of the process. These may include transmission of digital signature as the confirmation, and in one embodiment the payer electronic device may require that the user input a message e.g. a PIN on a keypad. In one embodiment, firmware may require that the PIN be input in response to payment information appearing on a display of the device, to prevent hackers utilising the payment application without the payer knowing.

The information about the payment may, in one embodiment, include product information, in the form of a listing including at least one product identifier. The method in this case includes the further step of the payer electronic device selecting at least one product identifier and the information associated with the payer includes the selected product identifier. In one embodiment, a listing including a plurality of product identifiers may be provided to the payer electronic device and the payer can then select from that listing. The selections are provided to the payee electronic device and the payee can therefore provide the products to the payer.

This has the advantage that the payee receives a product "order" and at the same time the order may be paid for. This allows a user to shop and pay at the same time.

In one embodiment, the payer electronic device can obtain all the payment information required for the transaction process from the payee electronic device and then can deal with the transaction process directly with the processing system. This takes the burden of transaction processing away from merchants and allows individual payers to have full control of the process without, for example, requiring them to give their credit card details over to the merchant. Instead, the payer electronic device provides account details to the transaction processing system.

In accordance with a second aspect, the present invention provides a method of processing a payment transaction, including the steps of a transaction processing system, receiving instructions for making a payment from a payer electronic device associated with a payer, the transaction processing system authorising payment, and the transaction processing system providing confirmation that the payment transfer has been authorised.

In accordance with a third aspect, the present invention provides an apparatus for facilitating a payment transaction from a payer to a payee, comprising a payer electronic device associated with the payer, the payer electronic device including payment information receiving means for receiving information about the payment, and payment instructing means for giving instructions for making the payment.

In accordance with a fourth aspect, the present invention provides a transaction processing system for processing a payment transaction, including payment instruction receiving means arranged to receive instructions for making a payment from a payer to a payee, from a payer electronic device associated with the payer, and a payment processing means for authorising transfer of funds from a payer account to a payee account.

In accordance with a fifth aspect, the present invention provides an apparatus for facilitating processing of a transaction, comprising a payee electronic device arranged for communication with a transaction processing system in accordance with a forth aspect.

In accordance with a sixth aspect, the present invention provides a database including a plurality of product listings available for payer electronic devices, whereby the payer electronic devices may select one or more products from the product listings, for transmission to a payee to fill the product request.

In accordance with a seventh aspect, the present invention provides a passive device being arranged to be readable by a payer electronic device for facilitating a payment transaction.

In accordance with an eighth aspect, the present invention provides a passive device including information identifying an application for an electronic device to utilise to process information associated with the passive device.

In accordance with a ninth aspect, the present invention provides a method of launching software applications, comprising the step of utilising a passive device including information identifying the location of the software application, uploading the information to a user device, and utilising the user device to obtain the application from a remote location.

In accordance with a tenth aspect, the present invention provides a method or organising a queue, comprising the steps of providing information to a user mobile phone which indicates the position of a user within the queue and updating the information as the users position in the queue moves.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Figure 1:
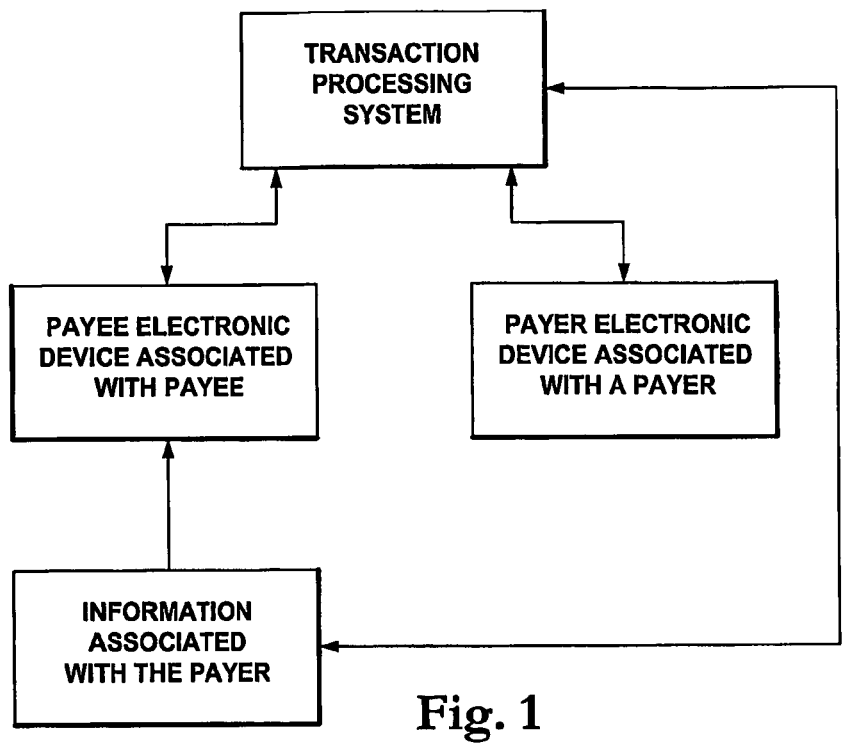
FIG. 1 is a schematic block diagram of a general payment method and system in accordance with an embodiment of the present invention.

FIG. 1 is a "high level" view of apparatus which may be used to implement various embodiments of the present invention. Unlike conventional payment transactions, which usually only require an electronic device associated with the payee (a "merchant device") and a transaction processing system (which may usually comprise a transaction acquirer/gateway and a financial institution) to process a payment, embodiments of the present invention require a further integer, being an electronic device associated with a payer, to be involved in the transaction processing.

In conventional systems, a merchant device usually obtains account identification data from a payer by swiping a magnetic card (or obtaining information from a smart card). The merchant device then prepares a message with all payment information (e.g. merchant ID, payment amount, merchant account, account ID of payer etc) and transmits the message to the transaction processing system. The transaction processing system may then check the account of the payer to ensure that sufficient funds are available for the transaction (depending on whether or not there is a floor limit associated with the account) and returns an approval of the transaction or denial of the transaction to the merchant device. If transaction authorisation (approval) is received, the merchant (payee) can be assured that the transaction will proceed.

This conventional process has all the security problems discussed above, as well as requiring every payee to implement infrastructure associated with the payment processing system.

In accordance with embodiments of the present invention, a payer electronic device 1 associated with a payer is required for a transaction processing system 2 to proceed with a payment transaction from a payer to a payee. In the embodiment in accordance with FIG. 1, information 3 associated with the payer will be provided to the payee electronic device 4. As will be seen later in this description, this information 3 may comprise different elements. For example, it may comprise account details of a payer or mere confirmation that a transaction between the payer and payee has been authorised.

Without involvement of the payer electronic device 1, however, the transaction will not be authorised. This adds an extra layer of security, and in some embodiments (to be described) greatly conveniences the payer and payee involved in the transaction. In some embodiments, the requirement for the payee to be involved in the payment transaction process may be obviated. Instead, the payer becomes the main channel for launching and dealing with payment transactions. This is a shift from the conventional paradigm of the merchant being responsible for transactions. Embodiments enable the payer to retain all their account details so that they do not have to pass via a merchant and do not compromise security.

Embodiments of the present invention implement a number of levels of sophistication of involvement of the payer electronic device 1. At one level, the payer electronic device merely provides a confirmation that a payment should proceed, and otherwise the transaction is processed substantially conventionally, via the payee electronic device and transaction processing system.

At another level, the payer electronic device launches the payment process and deals with transaction messaging with the transaction processing system. In this embodiment the payee electronic device may merely receive a confirmation that payment has occurred, all processing going by way of the payer electronic device.

At yet another level of sophistication, a means may be provided where the payer electronic device may select product via the transaction processing system, as well as pay for that product.

In one embodiment (first level), the information associated with the payer may be account information, provided by a means 3 for providing the information such as a swipe card, credit card, account card or smart card. A payee electronic device 4 associated with a payee, such as a card reading device, reads the information from the card 3 and sends information about the payment to a transaction processing system 2. The transaction processing system 2 will be described in more detail later, but will generally comprise a transaction gateway or acquirer, it may also comprise an issuing financial institution such as an issuing bank. This is a standard arrangement wherein the transaction gateway receives the processing information and checks with an issuing bank that a payer is able to pay. In this embodiment, the transaction processing system 2 then communicates with the payer electronic device 1 in order to obtain confirmation from the payer electronic device 1 that payment should proceed.

The payer electronic device 1 in this embodiment is a modified mobile phone and will be described in more detail later on in the description. The payer electronic device 1 transmits a confirmation to the transaction processing system 2 and the transaction processing system 2 then transmits payment authorisation to the payee electronic device 4.

Figure 2:
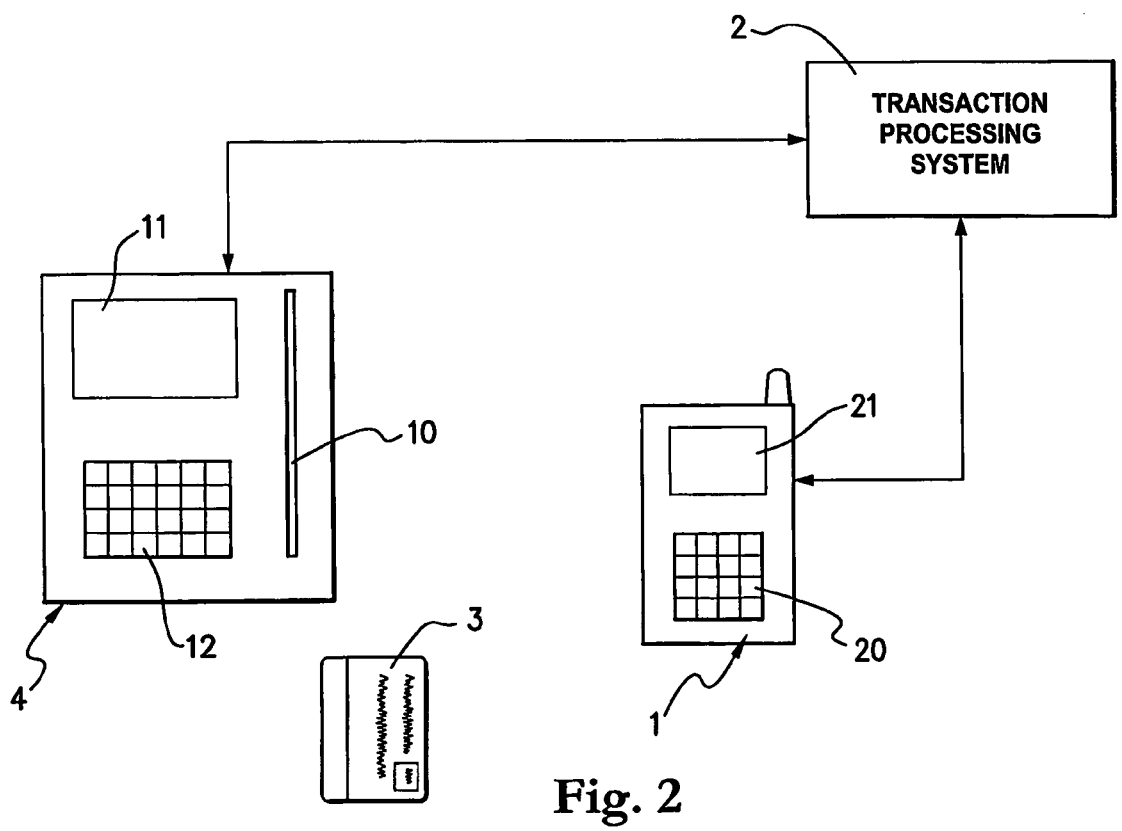
FIG. 2 is a schematic block diagram showing a payment system in accordance with an embodiment of the present invention in more detail.

FIG. 2 shows a different representation of the level one embodiment, comprising a payer electronic device 1 in the form of a modified mobile telephone, a payee electronic device 4 in the form of a conventional card reader with card swipe 10, display 11 and keypad 12. The transaction processing system is again represented by a block 2. The payer has a card 3 which may be a credit card. Referring to the flow diagram of FIG. 3, a transaction process in accordance with the embodiment of FIG. 2 will now be described.

At Step 13 the payer card 3 is swiped in the payee device card swipe 10. In the following description note that the "payee device" will be referred to as a "merchant device" or "MD".

At Step 14, a transaction message is sent from the MD 4 to the transaction processing system "TPS" 2. The transaction message may include all the information that is conventionally included for transaction processing e.g. credit card details, payment amount.

At Step 15, the TPS 2 transmits a request for confirmation that payment should proceed (a "request for confirmation") to the payer device ("PD") 1.

At Step 16, the payer keys in confirmation using the keyboard 20 of the PD 1. The PD 1 then transmits the confirmation to the TPS 2.

At Step 17, the TPS 2 transmits transaction authorisation to the MD 4.

The inclusion of the payer electronic device 1 in the process has the advantage of providing additional security to the transaction. The payer does not just require his credit card, but also requires access to his modified mobile telephone to enable a transaction to proceed. The payer may be required to key in a security code such as a PIN that the transaction processing system can compare with a PIN stored in a database.

It is unlikely that a fraudster would have access to a user's credit card, his mobile telephone, and also be aware of a PIN to enable a fraudulent transaction to go forward.

Other security measures may be implemented. In one embodiment, a digital signature security arrangement may be utilised between the transaction processing system and the PD 1.

In another embodiment, firmware may be utilised in the PD 1 to ensure that the payer must activate an input means (keypad 20) in order to ensure that the payment transaction goes forward. This avoids hackers being able to operate the phone remotely in order to approve payment transactions without the owner of the PD 1 being aware of it. With the firmware, the hacker cannot change the firmware and the payer 1 is required to key in confirmation via the keypad 20. The firmware 1 may also be arranged to require that payment information appear on the display 21 of the PD 1, so, for example, the payer may review payment information, such as payment amount, before keying in the confirmation.

Figure 3:
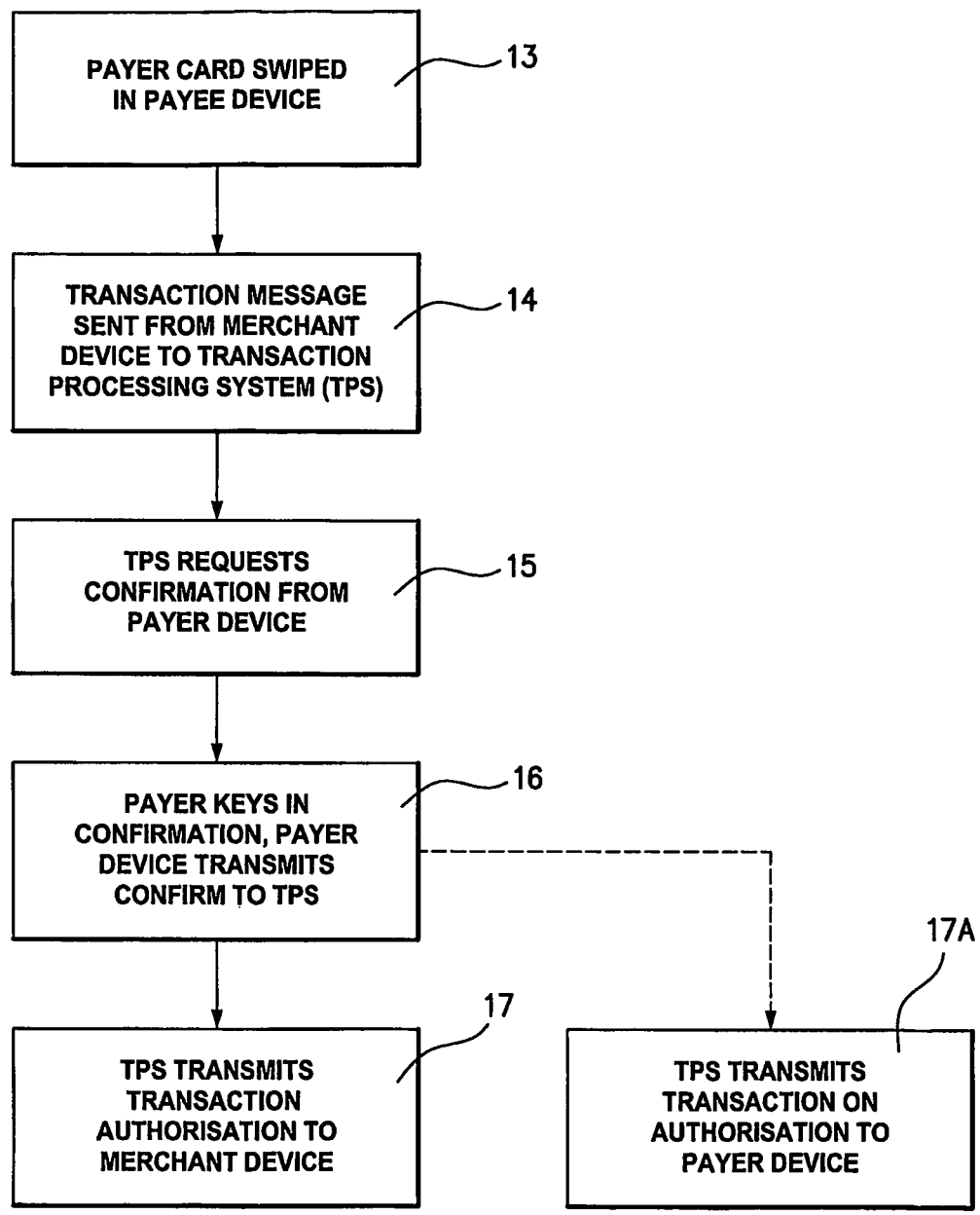
FIG. 3 is a flow diagram showing one possible operation of the payment system of FIG. 2.

In a variation of the process illustrated in FIG. 3, instead of or in addition to the TPS 2 transmitting the transaction authorisation to the MD 4 (Step 17), at Step 17A, the TPS 2 transmits the transaction authorisation to the PD 1. The payer then, for example, shows the authorisation to the payee (the authorisation appearing on the screen of the PD 1). In one embodiment, authorisation details may be provided on the screen 21 of the PD 1 in an encoded form which can be identified by an appropriate reader which may be provided with the MD 4. In FIG. 2 no reader is shown, but could be provided on the MD 4. For example, the coding could be a barcode appearing on the screen 21, to be read by an appropriate barcode reader on the MD 4.

A receipt for payment may also be sent to the PD 1, which may have an application for storing receipts for transactions and therefore keeping accounts.

The ability to use an electronic device associated with a payer to confirm that a payment transaction should proceed may also be applied to on-line transactions (as well as the point-of-sale ("POS") type transactions discussed above).

Figure 4:
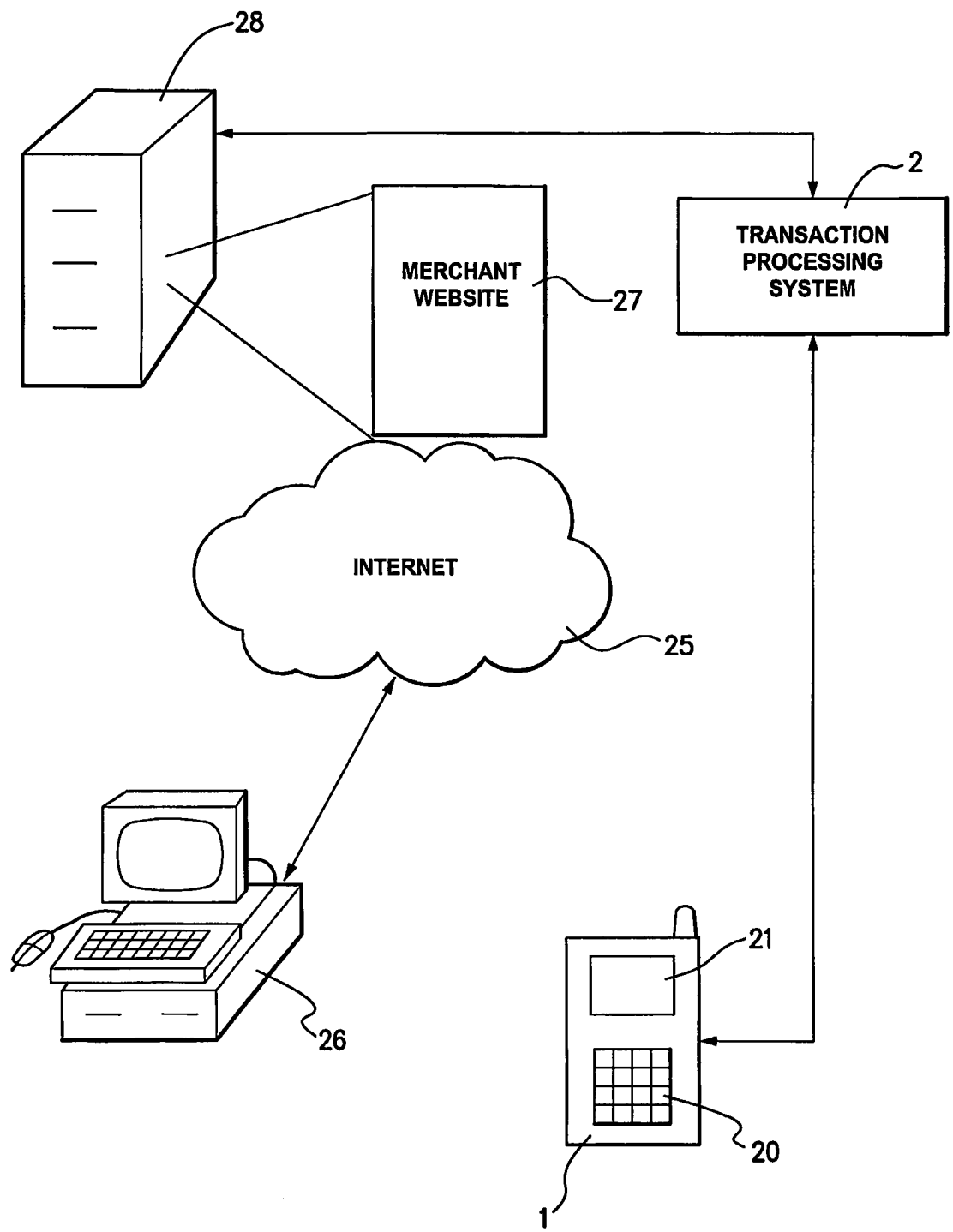
FIG. 4 is a block diagram showing a payment system utilising an embodiment of the present invention.

Referring to FIG. 4, a typical on-line transaction involves a payer accessing, via the Internet 25 and utilising a computer such as a PC 26, a merchant website 27 provided by a merchant server 28. After selection of a product the payer enters their credit card details. The merchant server 28 then continues to deal with the payment transaction. As is well-known, this process is open to fraud.

Figure 5:
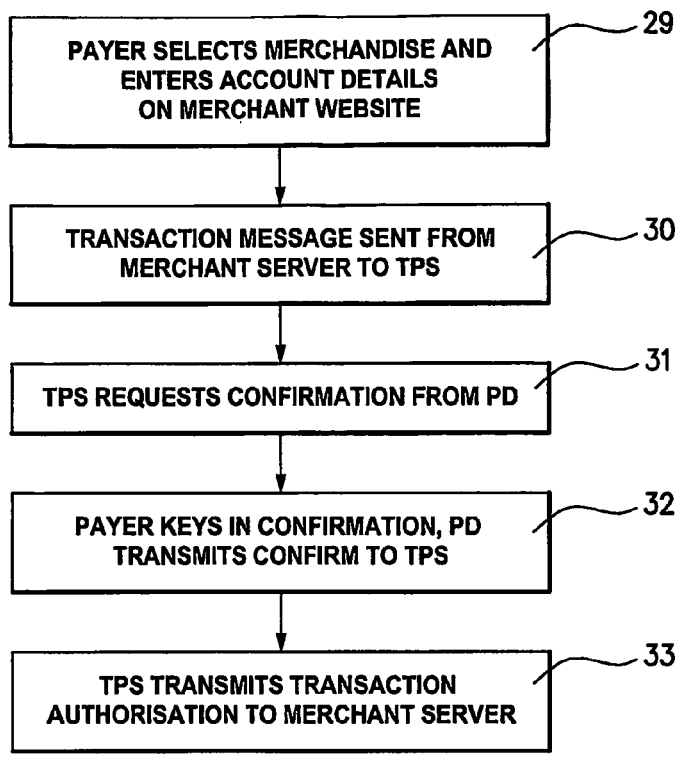
FIG. 5 is a flow diagram showing one operation process utilising the system of FIG. 4.

In accordance with an embodiment of the present invention, a PD 1 associated with the payer may be used to increase security. Referring to FIG. 5, a transaction process carried out in accordance with this embodiment will now be described.

At Step 29, a payer selects merchandise from a merchant website 27 and enters their account details (usually credit card number) on the merchant website 27.

At Step 30, the usual transaction message is sent from the merchant server 28 to a TPS 2.

In accordance with this embodiment, the TPS 2 then transmits a request for confirmation that payment should proceed to the PD 1. The payer keys in confirmation on his PD 1 (Step 32) and the PD 1 transmits the confirmation to the TPS 2.

The TPS 2 then transmits a transaction authorisation to the merchant server 28 (Step 33).

The TPS may have a database storing information enabling communication with the payer electronic device (e.g. mobile telephone number).

The above embodiments generally relate to the payer electronic device being used to provide an additional layer of security, by requiring confirmation from the payer electronic device that the payment transaction should proceed. The payer electronic device may also be used to receive transaction authorisation and receipts but, essentially, the transaction process is conventional and much of the messaging occurs between the payee electronic device and the transaction processing system. In the following embodiments, the payer electronic device may take on more of the transaction processing, resulting generally in an increase in convenience of operation of a transaction process.

Referring to FIG. 2, the PD 1 is provided with some means 35 that enables local communication. The means for enabling local communication 35 includes an "access device" and may include a contactless with smart card which is provided with the mobile telephone perhaps affixed to the mobile telephone). The payee electronic device 4 is provided with an appropriate reader 36. The access device 35 when touched to the reader 36 or when in close proximity to the reader 36 is arranged to provide information to the MD 4 that enables the MD 4 to subsequently communicate with the PD 1. For example, the identification information may be a telephone number so that the MD 4 can use a mobile telephone network to contact the PD 1. Alternatively, local wireless may be used for communication between the PD 1 and MD 4, e.g. Bluetooth™. The MD 4 can therefore send information about the payment to the PD 1. This can enable the PD 1 to take a more active role in the transaction process.

In one embodiment, the MD 4 may send a payment amount to the PD 1. A payer 1 may then vary the payment amount (appearing on the screen 21) and communicate the varied payment amount back to the MD 4 for subsequent transaction processing. Such an embodiment would be useful in a "tip" situation, for example. In a restaurant, for example, the payer may enter their tip using PD 1 which would prevent any fraudulent manipulation as may occur when tips are entered manually on payment slips. The rest of the transaction process may take place as described in above embodiments by confirmation being required by the PD 1.

Figure 6:
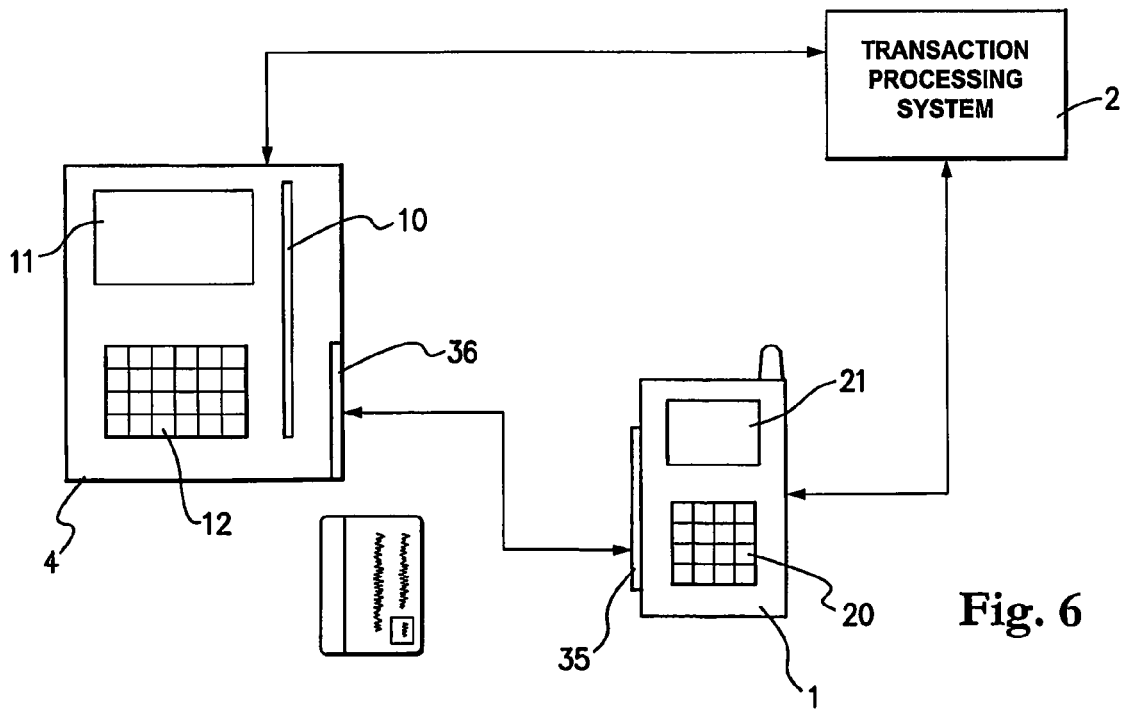
FIG. 6 is a block diagram illustrating operation of a system in accordance with a further embodiment of the present invention.
Figure 7:
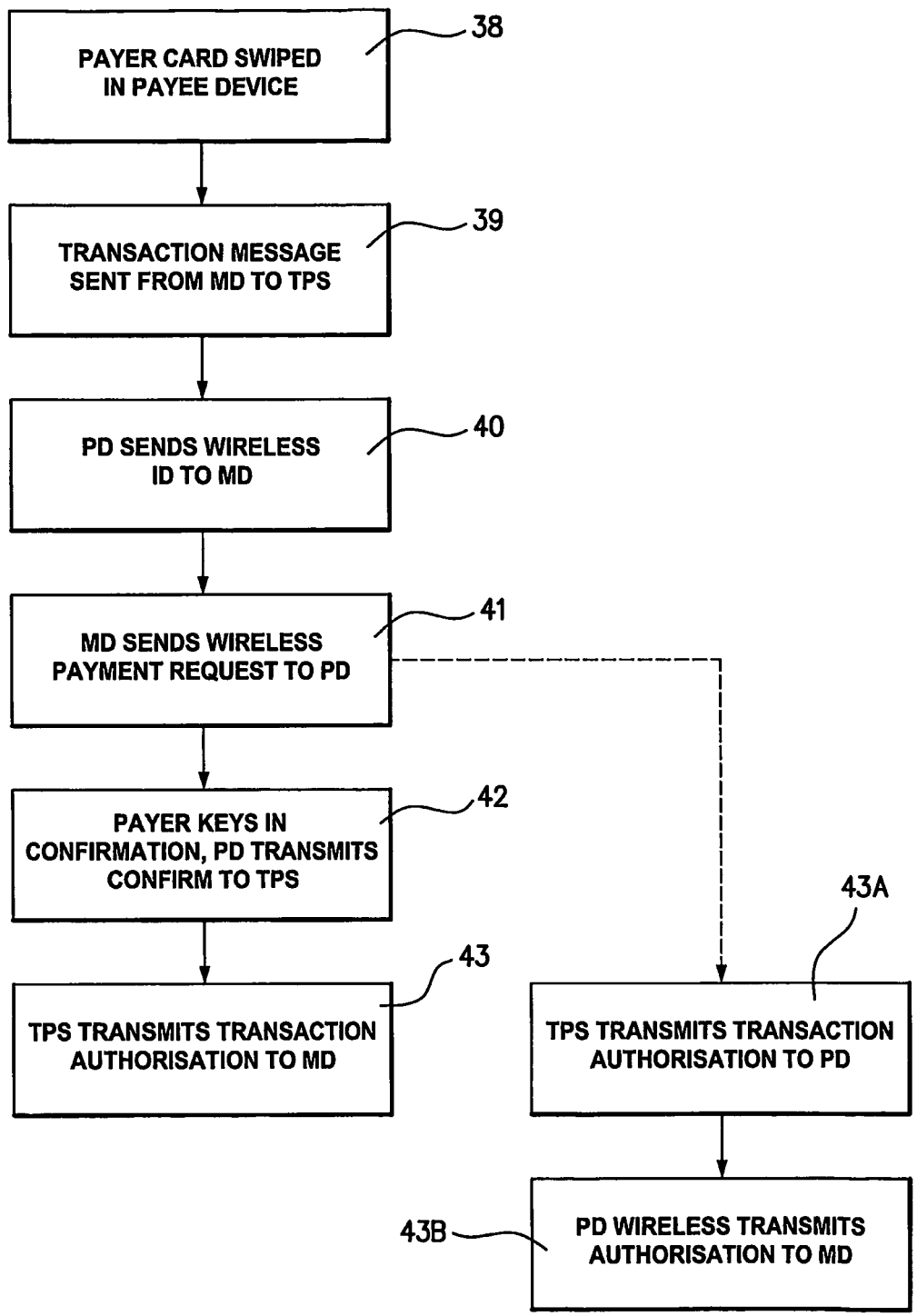
FIG. 7 is a flow diagram illustrating one possible operation of the system of FIG. 6.

FIG. 7 is a flow diagram showing a payment process which may be implemented utilising the embodiment of FIG. 6.

At Step 38, the payer card 3 is swiped in card reader 10 of the MD 4.

At Step 39, a transaction message with transaction information is sent from the MD 4 to the TPS 2. The PD 1 then sends wireless communication information via the access device 35 and reader 36 to the MD 4 to enable wireless communication between the MD 4 and PD 1 (Step 40).

At Step 41, the MD 4 sends a "payment request" to the PD 1, by wireless. The payment request may include payment information, such as a payment amount. Note that if the option is being given to the payer to vary the payment information (which is varying the payment amount) the MD 4 may await a reply from the PD 1 before sending a transaction message to the TPS (i.e. Step 39 would come further down the flow diagram).

At Step 42, in response to the payment request from the MD 4 (and after entering any further information, such as a variation in the payment amount) the PD 1 transmits confirmation that the transaction should proceed to the TPS 2.

At Step 43, the TPS 2 subsequently transmits transaction authorisation to the MD 4, letting the payee know that the transaction may proceed. Alternatively, the TPS 2 at Step 43A transmits the transaction authorisation to the PD 1 (and 43B) the PD 1 wireless transmits the authorisation to the MD 4.

Note that a separate access device (such as smart card 35) may not be required, and instead access may be incorporated in the appropriately configured PD 1 and MD 4 e.g. to allow direct wireless communication.

Figure 8:
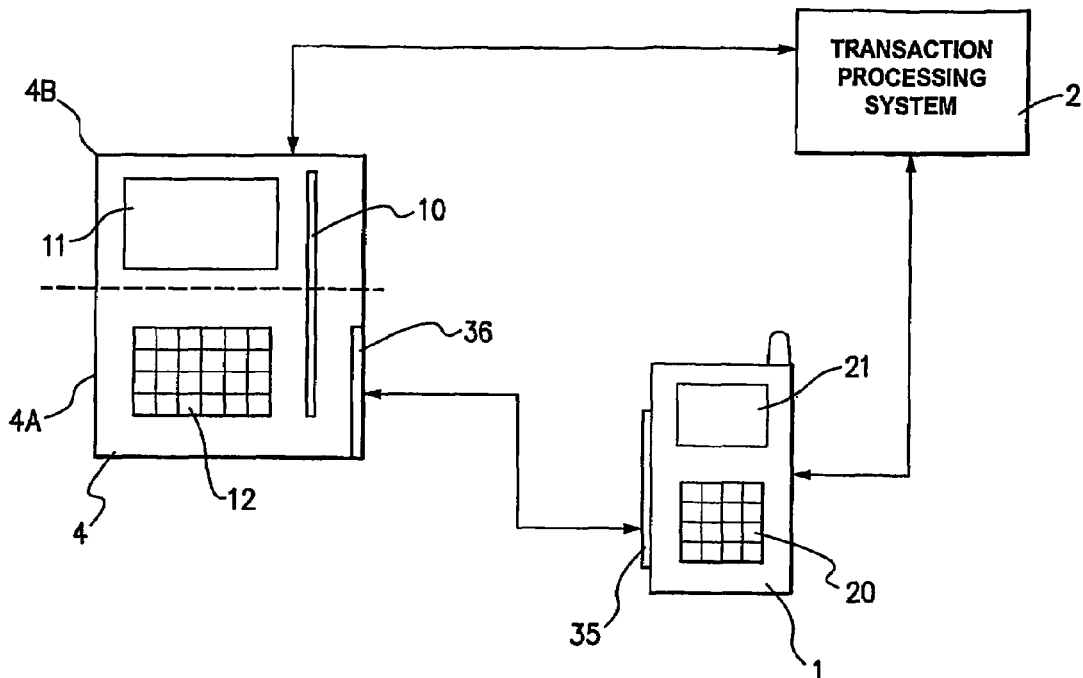
FIG. 8 is a block diagram illustrating operation of a payment system in accordance with a further embodiment of the present invention.

In the embodiment of FIG. 6 and FIG. 7, the payer still swipes a card in the payee device, and the merchant device still deals with much of the transaction processing. FIG. 8 illustrates an embodiment where no card or device other than the payer device 1 is required by the payer in order to process a transaction.

An access device 35 and reader 36 may still be provided (or, as discussed above, the devices 1 and 4 may be appropriately configured to initialise short range communication in some other way). In this embodiment, the PD 1 also includes an application (which may be implemented in software) enabling it to formulate transaction messages for use in transaction processing.

Figure 9:
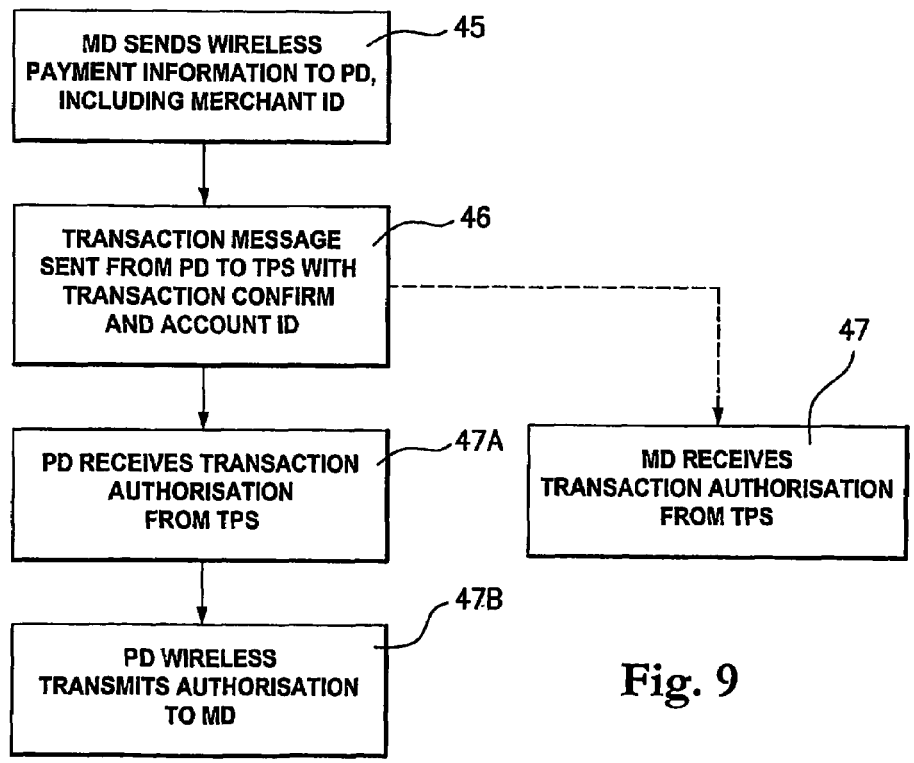
FIG. 9 is a flow diagram showing one possible operation of the system of FIG. 8.

Referring to FIG. 9, to undertake a payment transaction, PD 1 and MD 4 establish communications with each other. Then, at Step 45 MD 4 sends payment information (by wireless) to the PD 1, including information required to process a payment such as merchant ID and payment amount.

At Step 46, a transaction message is sent from the PD 1 to the TPS 2, including the usual information required for transaction processing, such as merchant ID, payment amount and identity of the payer so that a payer account can be identified. At the same time, the transaction message may include confirmation that the transaction should proceed.

At Step 47, the TPS 1 may transmit transaction authorisation to the MD 4. Alternatively, at Step 47A, the PD 1 may receive transaction authorisation communicated from the TPS 2 and at Step 47B the PD 1 wireless transmits the authorisation to the MD 4.

It will be appreciated that if the pathway 47A and 47B is chosen, there is no need for a merchant device having the ability to communicate with the TPS 2. Payee electronic devices may therefore be provided which only have a local communications facility (e.g. wireless) to communicate with a payer electronic device, the payer electronic device subsequently carrying out the bulk of the transaction processing communications. A major advantage of this arrangement, is that account details (such as credit card details) of a payer may never need to go via a merchant device. Further, from a convenience and security point of view, the payer has total control of the transaction. As discussed in relation to above embodiments, payment information may appear on the screen 21 so that the payer may review the information, varying the information via the keypad input 20 (such as varying a tip) etc. The payer has total control.

Note that in a variation on this embodiment, all communications may go via the MD 4. That is, a payment message may be prepared by the PD 1 and then locally wireless transmitted to the MD 4 for subsequent passing on to the transaction processing system. This is a less secure alternative, as all the payer information will then pass via the merchant device. It may be convenient in some circumstances, however (e.g. where there are communications difficulties between the PD and the transaction processing system 2).

The account ID of the payer may be transmitted in encrypted form, together with a digital signature. Any security may be applied. In one embodiment, the transaction processing system 2 keeps a database of "split" account numbers. That is, a portion of the account number is kept by the TPS 2 database, and another portion of the account number is kept by the payer device 1. A hacker cannot therefore obtain all of the account ID by hacking into the PD 1.

In a further option, the merchant device 4 may comprise two parts 4A and 4B (FIG. 8). Part 4A may be a mobile device, such as may be carried by an operative such as a waiter in a restaurant. Part 4B may be a payee electronic device. The waiter may take the device 4A close to the PD 1 in order to obtain communication details (e.g. to initialise communication), so that the PD 1 can subsequently communicate with the part 4B enabling, for example, the PD 1 to upload transaction details and then continue with the transaction process.

The device 4A may provide contact details for the other part of the device 4B. The device 4A may in fact be a passive device, which can be powered from power from the PD 1. In a restaurant situation, for example, the part 4A may be able to provide information such as a table number in the restaurant so that, in subsequent communication with the part 4B (which may be an electronic cash till) the payer can be identified as being the person sitting at that particular table in the restaurant and therefore a bill for the payer can be calculated and generated by the part 4B and transmitted to the PD 1 associated with the payer.

The two part merchant device 4 may take any convenient configuration. The part 4A merely needs to provide information enabling a payer device 1 to contact the (usually more complex) part 4B in order to obtain payment information.

Figure 10:
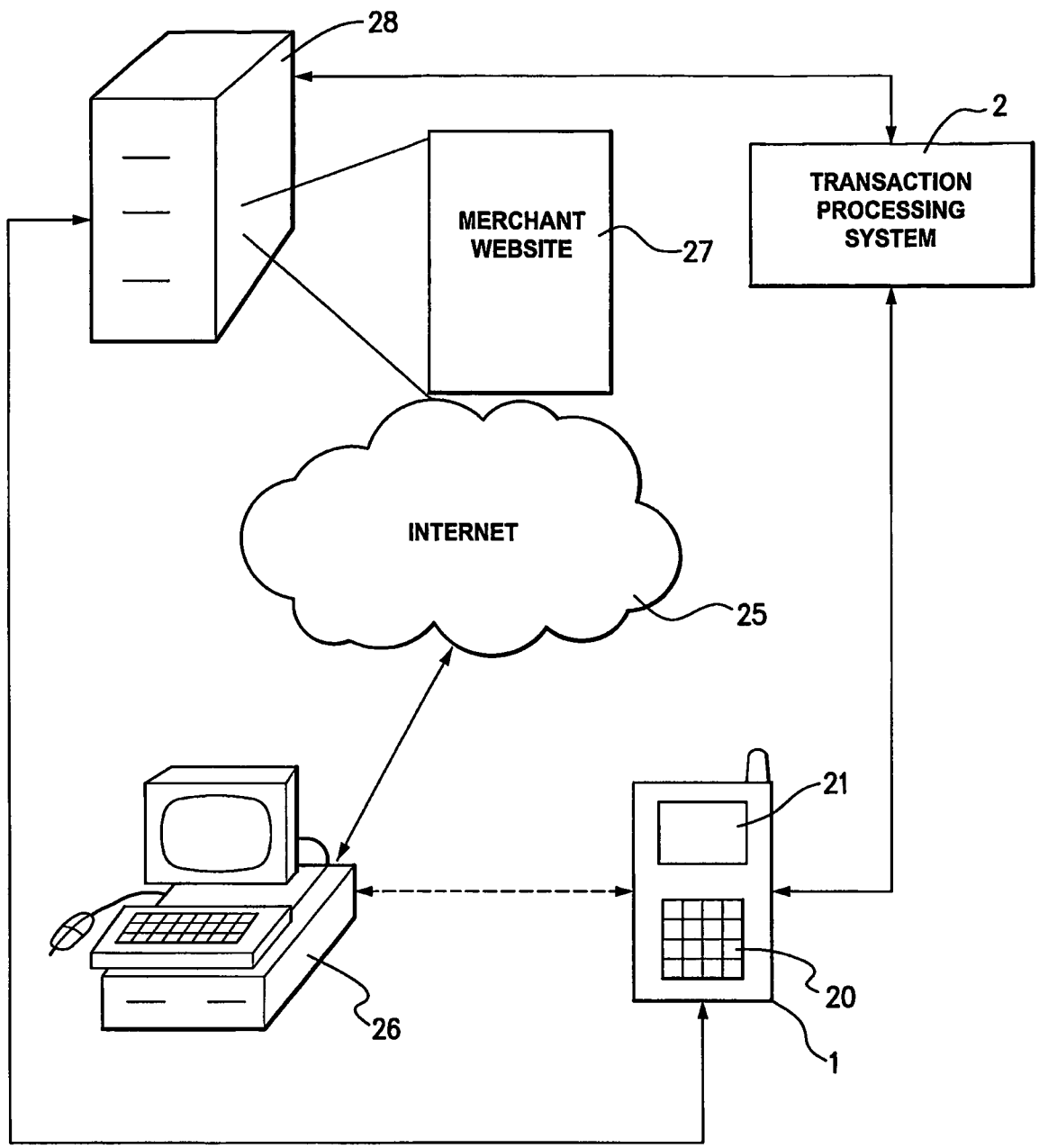
FIG. 10 is a block diagram showing operation of a payment system in accordance with a further embodiment of the present invention.

FIG. 10 illustrates a system where a PD 1 can deal with transaction processing for on-line payments. The same reference numerals are used in FIG. 10 as were used in FIG. 4 to denote similar components.

In this embodiment, the PD 1 includes an application for preparing transaction messages for transaction processing.

Figure 11:
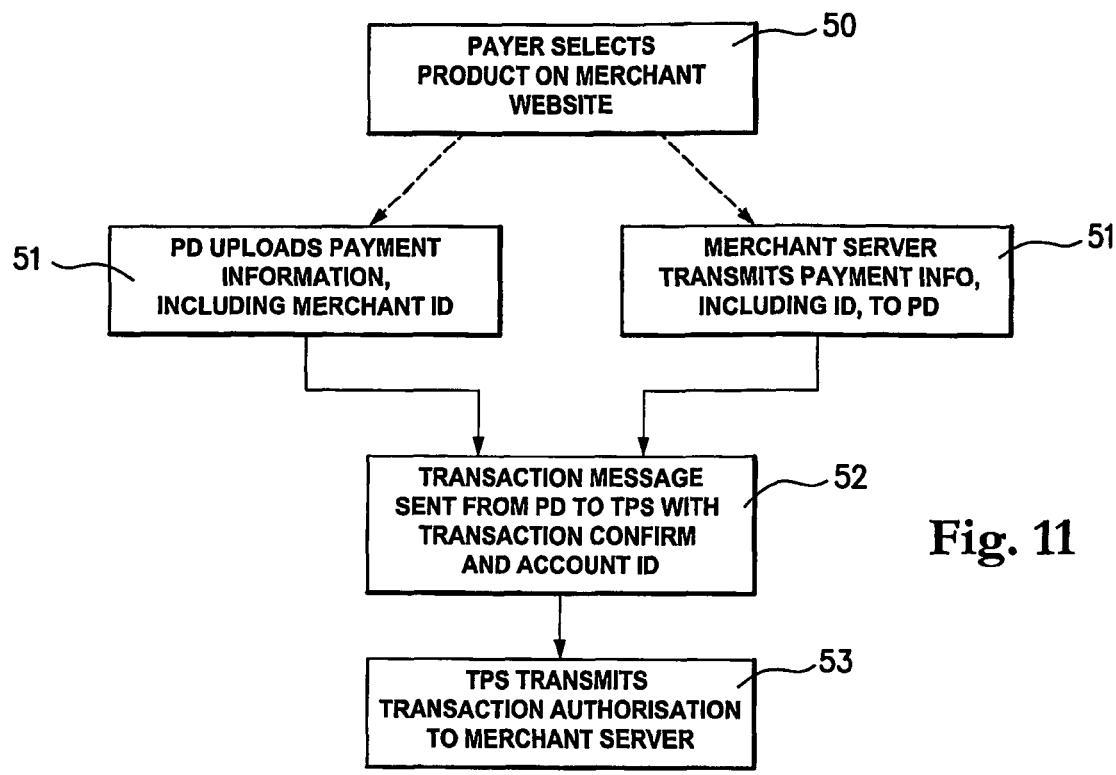
FIG. 11 is a flow diagram illustrating one possible operation of the system of FIG. 10.

Referring to FIG. 11, at Step 50, a payer selects, via PC 26 and Internet 25, a product from a merchant website 27.

At Step 51, the PD 1 uploads payment information, including merchant ID and payment amount (and any other information that may be required for a transaction process to go forward). Uploading may be via a wired or wireless communication with the PC 26. Alternatively, when selecting product 27, the payer may provide the merchant server 28 with contact details for the PD 1, and the merchant server 28 may then send (e.g. by mobile telephone communications network) the payment information to the PD 1. In yet a further alternative, PC 26 may be dispensed with, and PD 1 (which may be a modified web-enabled mobile telephone) directly accesses the website 27 and uploads payment information.

At Step 52, a transaction message is prepared by the PD 1 and sent to the TPS with transaction confirmation and account ID.

At Step 53, the TPS 2 transmits the transaction authorisation to the merchant server. Subsequently, a receipt may be produced for the PD 1 (and may be transmitted from the merchant server to the PD 1).

Encryption and other security aspects that are discussed above may apply in this embodiment. A major advantage of this embodiment is that account details, such as credit card details are not required to be placed on a network such as the Internet.

Figure 12:
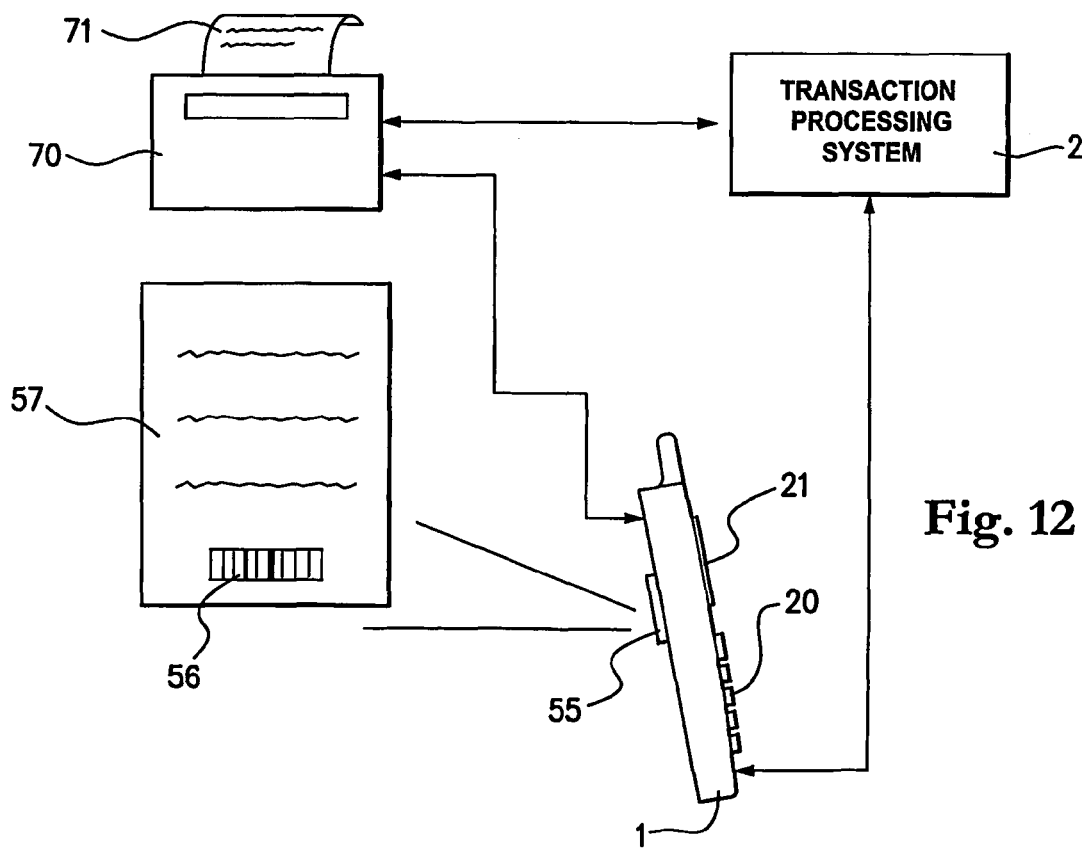
FIG. 12 is a block diagram showing operation of a system in accordance with a further embodiment of the present invention.

FIG. 12 illustrates a further embodiment of the present invention. In this embodiment, the payer electronic device 1 includes a reading means 55 which is arranged to read payment information from a passive device 56. In the illustrated embodiment, the reading means 55 is a camera 55 (cameras are now commonly provided with mobile telephones). The reading means may be any other convenient reading means, however, such as a barcode scanner. In this embodiment, a camera 55 is utilised together with application software enabling the mobile telephone to detect the passive device image from the camera and process the information provided by the passive device.

Further, the passive device 56 need not be a bar-code, but could be any passive device which can be read to provide payment information e.g. RF.

In one embodiment, the payment information provided by the passive device may be a merchant ID, enabling the PD 1 to subsequently communicate with a merchant device 4 such as in the embodiment of FIG. 8. Processing then may subsequently proceed along the lines of the process of FIG. 9 except that the payment information from the MD 4 is obtained via the passive device and reader means 55 in the PD 1. The passive device may be a barcode on a table in a restaurant, for example.

At a more sophisticated level, the passive device may provide payment information which enables the PD 1 to proceed and launch a payment transaction. For example, the passive device 56 may include sufficient information for a PD 1 with the appropriate software applications to prepare a transaction message for a transaction processing system 2.

Figure 13:
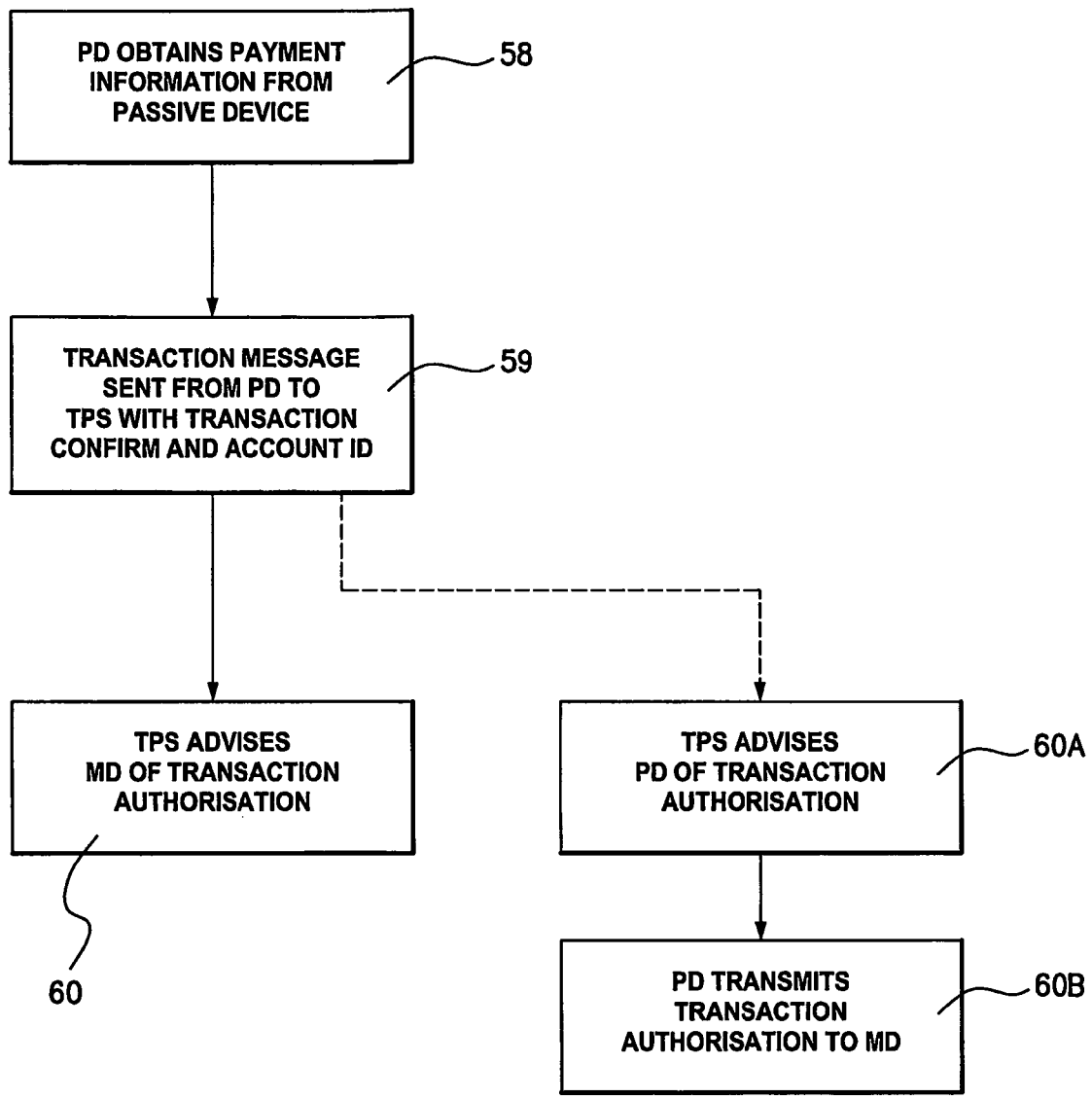
FIG. 13 is a flow diagram showing one possible operation of the system of FIG. 12.

Operation of the system of FIG. 12 will now be described in relation to FIG. 13.

At Step 58, the PD 1 obtains payment information from the passive device 56. In the embodiment of FIG. 12, the payer takes a photograph of the barcode 56 with his camera 55 and the application on the PD 1 recognises the barcode and obtains the payment information.

Also in the embodiment of FIG. 12, the barcode 56 is provided with a bill 57 which may, for example, be a restaurant bill. The information on the barcode 56 includes all the information required to process a transaction for paying a merchant (e.g. the owner of the restaurant). That is, it will include a merchant ID, payment amount and any other information that is required to prepare a transaction message.

At Step 59, a transaction message is prepared by the PD 1 and is sent to the TPS 2 together with transaction confirmation and an account ID of the payer.

At Step 60, the TPS 2 communicates with the MD 70 and provides the MD 70 with transaction authorisation. Alternatively, as with above embodiments the TPS 60A may advise the PD 1 of the transaction authorisation and the PD at 60B then transmits the transaction authorisation to the MD 70. The MD 70 may produce a receipt 71 and/or transmit an electronic receipt to the PD 1. Alternatively, the transaction processing system 2 may receive an electronic receipt from the MD 17 and transmit it on to the PD 1.

It will be appreciated that such an arrangement has significant advantages. For example, bills received through the post (utility bills, for example) may include a passive device including payment information which may be read by a reader of a payer's electronic device to enable the payer electronic device to deal with bill payment.

In a further embodiment, the passive device may provide a transaction ID number, and require the PD 1 to communicate with a remote database (e.g. run by a merchant system) containing the transaction information. The database may be associated with an electronic cash register, for example. The PD 1 then picks up the required payment information from the database and carries out the transaction by communicating with the TPS 2. In this embodiment, the payer may even manually key in the transaction ID number.

Note also that in the above embodiments where the payer device deals with the transaction, the merchant device must be arranged to recognise a transaction approval code (or similar identifier) sent either by the phone or by a TPS 2 in response to transaction processing initiated by the PD 1.

Some example situations where this embodiment would be useful are as follows:

- A bill is produced by a merchant cash register with a bar code including payment information. The PD 1 scans the barcode (takes a photograph), the payer authorises a transaction via the TPS 2. The TPS approves the transaction and informs the payer via PD 1. The PD 1 displays an authorisation code on its screen 21 which is read by a barcode reader (not shown in FIG. 12) at the merchant store.
- A variation on the above example is for the response from the transaction processing system 2 to be conveyed directly to the merchant device 70 via the Internet or other electronic system.
- A docket is produced at a merchant cash register incorporating the barcode. The barcode is read by a PD 1 by a payer at a table in a café. The payment is processed and a response is sent to the cash register or even to the phone of a waiter serving the table. The consumer can then leave.

In a further embodiment, as well as payment information being provided to the payer device, product information may also be provided. The product information may be provided in the form of a listing which includes at least one product identifier, and the payer device includes means (which will generally be a software application) enabling selection of a product. The information on selection of the product can be transmitted to a payee (via a payee electronic device) so that, as well as the payer electronic device being able to pay the payee it can also order product. This enables a payer electronic device to become "personal cash register". The payer can both order and pay for product using their own device.

The product information may be provided by a number of means, including by passive devices (such as barcode) transmission from a payee electronic device, uploading from the Internet, etc.

Figure 14:
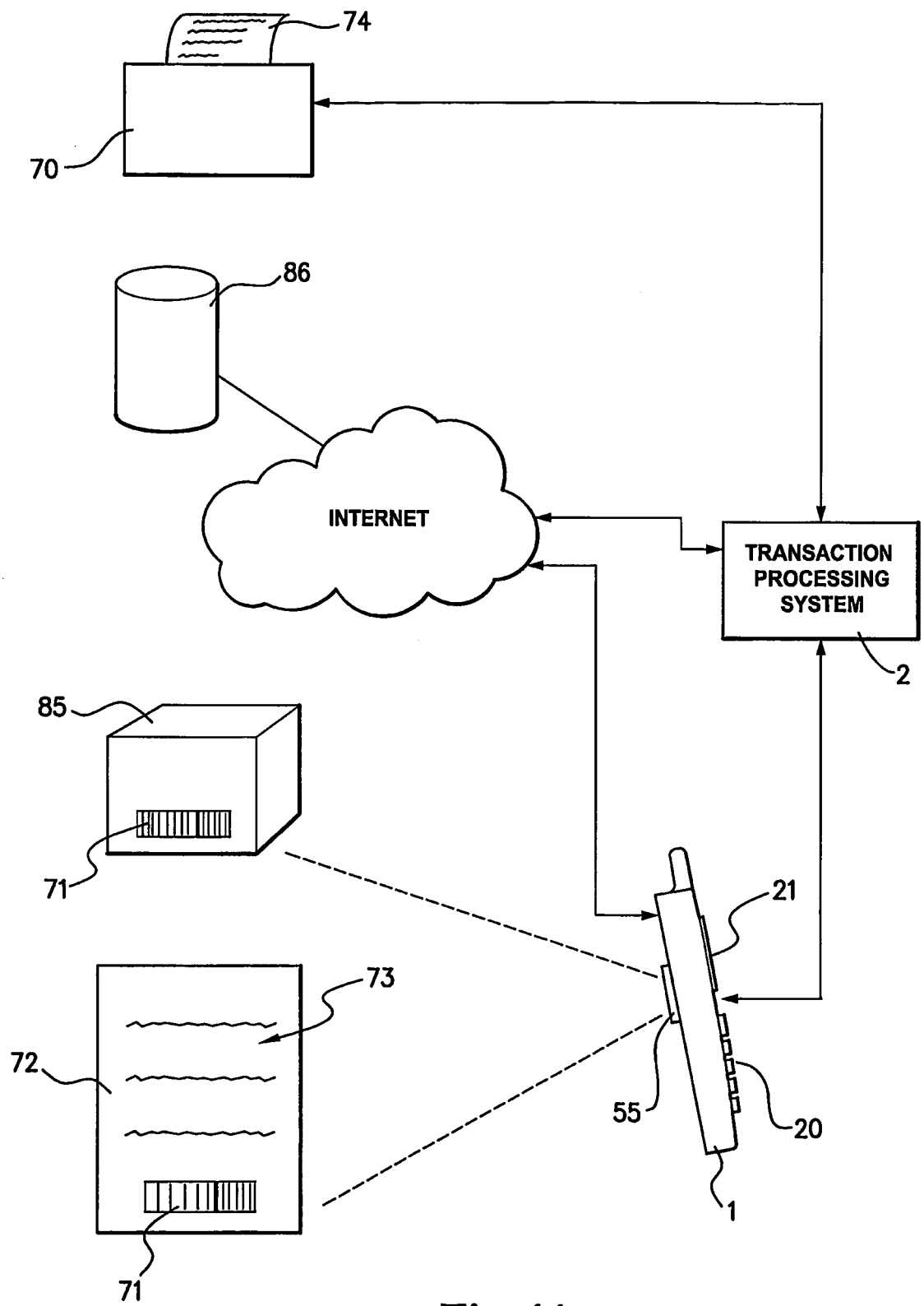
FIG. 14 is a block diagram showing operation of a system in accordance with a further embodiment of the present invention.

FIG. 14 illustrates a number of options for obtaining and utilising product information in accordance with this embodiment. It will be appreciated that the invention is not limited to the options illustrated in FIG. 14.

One option is to provide the product information via a passive device such as a barcode 71 which may be associated with the product. In FIG. 14, one example is shown as a restaurant menu 72 which includes a conventional list of items 73 as well as a barcode 71 which may be photographed by the PD 1 of the payer to upload a menu to the PD 1.

Figure 15:
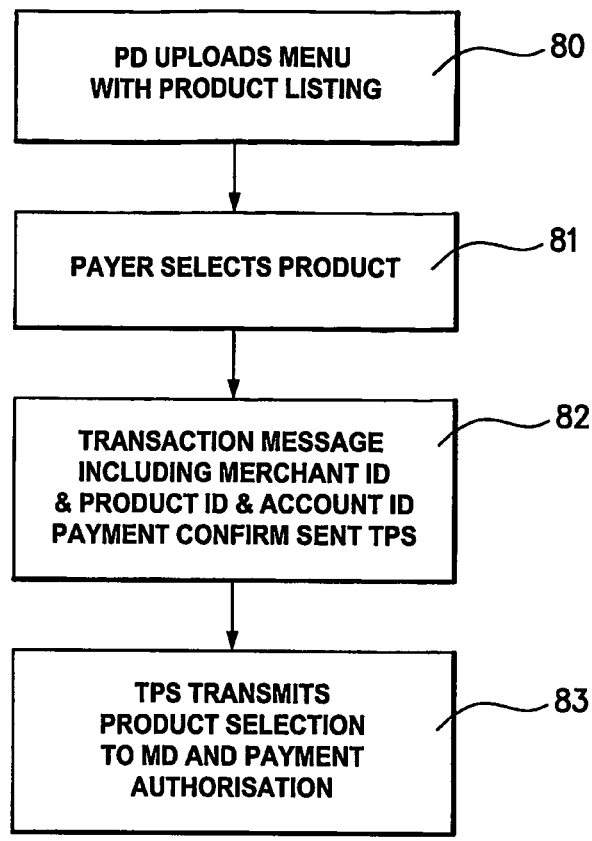
FIG. 15 is a flow diagram showing one possible process of operation of the system of FIG. 14.

Referring to FIG. 15, an example process is as follows.

At Step 80, the PD 1 uploads the menu including the product listing. A software application on the PD 1 enables a list of products to appear on the display 21 and a payer may select from the list utilising the input 20 (Step 81).

At Step 82, the PD 1 prepares a transaction message including the merchant ID, product ID, account ID or any other information that is required to process the transaction and also order the product. The transaction message is sent to the TPS 2.

The TPS 2 transmits the product selection to the MD 70 and also transmits the payment authorisation after the TPS 2 has authorised the payment.

If the product information relates to a menu in a restaurant, therefore, the payer selection is received by the MD 70, and will include an ID of the payer (e.g. table number) and a list of products (e.g. food) that the payer has selected. The merchant can therefore fill the order and provide the food and drinks to the payer, at the same time being confident in the knowledge that they have already been paid.

In this embodiment, the payee electronic device may provide a means for displaying the order, which in the illustrated embodiment in FIG. 14 is a printer which prints out the order 74 which can then be easily handled by merchant operatives in order to enable them to fill the order.

The transaction processing system 2 incorporates an ordering system, which is arranged to process and forward orders (product selections) to payees.

Product information can be provided in many ways, and can be utilised for shopping in many aspects. Other examples of menus in restaurants include:

- Products in shops/supermarkets may be provided with barcodes 71 identifying the product and providing payment information to enable the PD 1 to process a payment transaction for the product 85. The PD 1 in this case could select more than one product, total the payment and undertake one transaction. The TPS 2 then advises the merchant device (in this case which may be an electronic cash register) that these products have been purchased. Entry to a cash register is therefore automatically facilitated and may not require any operative associated with the store cash register. An appropriate system may be implemented to remove any security from the product 85 so the payer can leave the store with the product. Receipts may be generated (as discussed above) to the PD 1.
- Product listings may be downloaded from a database 86 which effectively is a "shopping" database. The database may include a plurality of merchants with a plurality of product listings associated with the merchants. A payer, via the PD 1, may request the menu of a particular merchant (perhaps by communicating a merchant ID) or may browse the listing and upload one or more menus. They can subsequently shop and obtain and pay for the goods remotely or order and pay for the goods and attend at the merchant outlet to receive the goods. An appropriate receipt may be provided to the PD 1 (e.g. a barcode appearing on the screen) that can be cross referenced at the merchant outlet to ensure that the goods are provided to the correct person.

Figure 16:
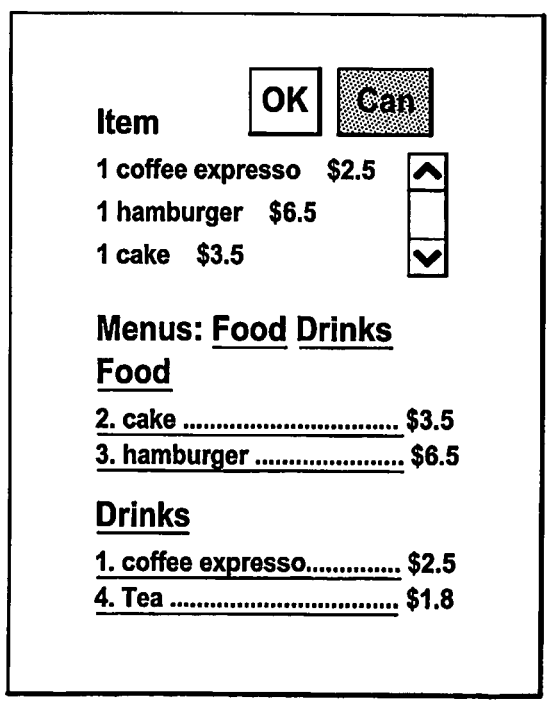
FIG. 16 is a example view of a "menu" appearing on a payer electronic device in the system of FIG. 14.

The database may provide, for example, takeaway menus for restaurant and cafes. An example of such a menu uploaded to a PD 1 is shown in FIG. 16. A payer may upload a menu to their PD 1 for a café on the way to work, for example. They may enter an order for coffee, hamburger and cake and transmit the order via the TPS 2 to the café and at the same time pay for the order. When they arrive at the café, their order may be ready. Note that menus may be provided from the "universal shopping database", from a system associated with the merchant e.g. a merchants website, and may be uploaded to the phone via a network such as the Internet or provided from passive devices such as barcodes.

As discussed above, the payee electronic device 70 may merely comprise a printer which is arranged to receive the transaction authorisation from the TPS 2 and printout an order (and printout a receipt 74). The major burden of payment processing is undertaken by the TPS 2 and PD 1.

Security as discussed in previous embodiments may be implemented e.g. digital signature confirmation of payment from the PD 1.

Note that in one embodiment, the transaction processing system 2 may administer the database 86. In such an embodiment, the PD 1 may send a merchant ID an optional product code or product family code to the TPS 2, which can access the database 86 and send a menu of items available back to the PD 1 including price and description. The payer selects an item via the PD 1 and then sends a list of items, store ID (an optionally a location within the store) to the TPS 2. The TPS then obtains payment authorisation and sends the paid order to the store together with customer identification. As discussed above, the customer identification may include a code which needs to be matched by a code provided by the PD 1 in some form (e.g. barcode).

The merchant then provides the goods to the customer (e.g. food at the café, food home delivered, goods home delivered, goods available at "pick-up" point of the store). Again as discussed above, deactivation of secure ID tags may allow the person to simply leave the store with the goods.

As discussed above, there are a number of ways in which information may be obtained by the electronic device of the payer in order to bill and order. For example, optical reading (for example camera software), smartcard reader/RFID tab reader, etc may be used to gain details of the store and in some cases location within the store for example table number or payment point. Items can be selected either by scanning the items using RFID reader/optical reader, selecting by scroll and click from a menu of products/services downloaded to software on the phone, or manually entering product codes.

The following are five examples which demonstrate use of the system in accordance with an embodiment of the present invention for ordering and paying in a restaurant, café, etc.

EXAMPLE 1

Standard Full Service Restaurant 1. bill is produced and delivered with optical/elec readable café/table/amount;
2. customer taps/photo bill/wallet;
2(a). where amount is not on bill/wallet request is sent to kitchen for amount which is then sent to phone;
3. customer adds any tip and presses ok—all is complete.

EXAMPLE 2

Full Service Café

1. customer taps/photos table number (which is café/table number);
2. request is sent to kitchen (via system) for amount which is then sent back to phone;
3. customer adds any tip and presses ok—all is complete.

EXAMPLE 3

Order and Pay at Counter Café

1. customer picks up table no from counter or sits a table with no already present;
2. customer taps/photos café/table number (this number also tells phone to enter order mode);
3. menu is sent to phone;
4. customer enters item numbers from menu/blackboard (mostly max two digits) and then presses ok. Alternately customer scrolls through items and clicks ok for items to order;
5. phone displays complete order as text with amount. Phone sends order to salt which is sent back phone as text—this orders and pays in one step!!;
4. order slip prints in kitchen;
5. staff deliver order when prepared.

EXAMPLE 4

Juice/Sandwich Bar/McDonalds Etc 1. customer photos/taps 'café' number;
2. menu is sent to customers phones;
3. customer enters item numbers from menu/blackboard (mostly max two digits) and then presses ok. Alternately customer scrolls through items and clicks ok for items to order;
4. customer name sent and order sent for printing on kitchen slip;
5. if customer name called when order is ready, if no answer phone can be 'buzzed'.

EXAMPLE 5

Modernised Full Service Restaurant Café

1. customer can select to order at table, with option to signal need for assistance with menu. Staff may make routine to tell specials etc and when menu is 'delivered' electronically 'wait for staff to tell specials' may be displayed.
2. Even when order is sent, phone returns to 'more order mode' allowing further orders of desert, coffee, wine etc. End meal option prompts for tip—sends payment and notifies restaurant so staff can say 'bye' etc.
3. Order in advance capability by using system as above from takeaway menu or stored list, sending name, in place of table number—take away orders, phoned in, paid, and can notify purchaser when ready.

As discussed above, contactless smartcards may be used to provide or obtain information about the payment. Equally well contact-type devices could be used where a contact is touched by another contact in order to obtain the payment information. These devices are known.

A further example of transaction flow where a payer is equipped with an electronic device capable of both initiating a transaction and making payment is as follows:

Payees are provided with identification codes identifying the payee to the TPS. Unique identification codes are provided for each point of service the payee offers including table numbers where the payee offers table service, takeaway food or other food service counters. Each payment station at the payee, is also allocated a unique identification code.

The identification code of the payee may have been provided on:
1. a form of business card of the payee either in printed or electronic form;
2. on a printed menu or pamphlet of the payee;
3. at a table number identifier within the payee premises;
4. by being located at any other convenient position.

Payer initiates transaction by nominating the payee unique identification code by one of the following means:
1. selecting payee identification code from a list 'frequent payee's stored by software either in the phone or stored on a remote server for the use of this payee;
2. entering the payee identification code manually;
3. entering the payee identification code automatically;
3(a). optically scanning the code via camera and decoding software linked or incorporated in the device;
3(b). via 'bar code' scanner or similar optical reader linked to the device or incorporated in the device;
3(c). via RFID reader or contactless smart card reader linked or incorporated in the device;
3(d). via RFID or contactless smart card used to initiate a device of the payee to supply the identification code to the device via Bluetooth or other wireless means.

If the payee identification number detected or entered to the device of the payer identifies a payment station the required transaction precedes as described for a payment.

If the identification number identifies any other point of service of the payee then it is assumed the payer wishes to now identify the goods and of services the payer wishes to obtain and pay for from the payee.

The device of the payee may then be presented with a menu of options available from the payee.

The payer selects each item required by item identification code. These codes may be either:
1. entered manually using the device keyboard e.g. 5 <ok> where '5' is the code of the item desired;
2. selected from the menu for this payee provided to the device using 'scroll and select' methods well known on small devices such as mobile phones;
3(a). optically scanning the code via camera and decoding software linked or incorporated in the device;
3(b). via 'bar code' scanner or similar optical reader linked to the device or incorporated in the device;
3(c). via RFID reader or contactless smart card reader linked or incorporated in the device;
3(d). via RFID or contactless smart card used to initiate a device of the payee to supply the identification code to the device via Bluetooth or other wireless means.

At completion of the list the payee indicates the list is complete, for example by pressing <ok> without entering any code. The device of the payee may then display the list of items selected for review by the payee and the cost of the items.

The payee has the option at this point to vary the account to use for payment from the default account, to simply indicate to proceed (e.g. for example by pressing 'ok') or to cancel.

The device of the payee may request a PIN or other biometric to confirm the transaction.

The list of items is then sent either directly to equipment provided to the payee to receive this list, and in a preferred embodiment to print this list or indirectly via the TPS. Depending on the commercial arrangements of the payee, payment may be either already completed before the list is sent to the payee or reserved to be sent at a later point e.g. when the goods or services are received by the customer or when the customer elects to complete transactions with the payee. In all cases the system provides for surety of payment by way of identifying the payer from the beginning.

The payer device of the payer may be configured to continually allow addition items to be ordered until the payer nominates. In this case payment may launched at this time and the payer may be provided with the option of varying the amount to be paid or of "splitting the bill".

Splitting the bill allows for additional payers to join the transaction at the payee identification code with each payer indicating a number of shares (e.g. 1 person, 2 people) of the total amount.

Figure 17:
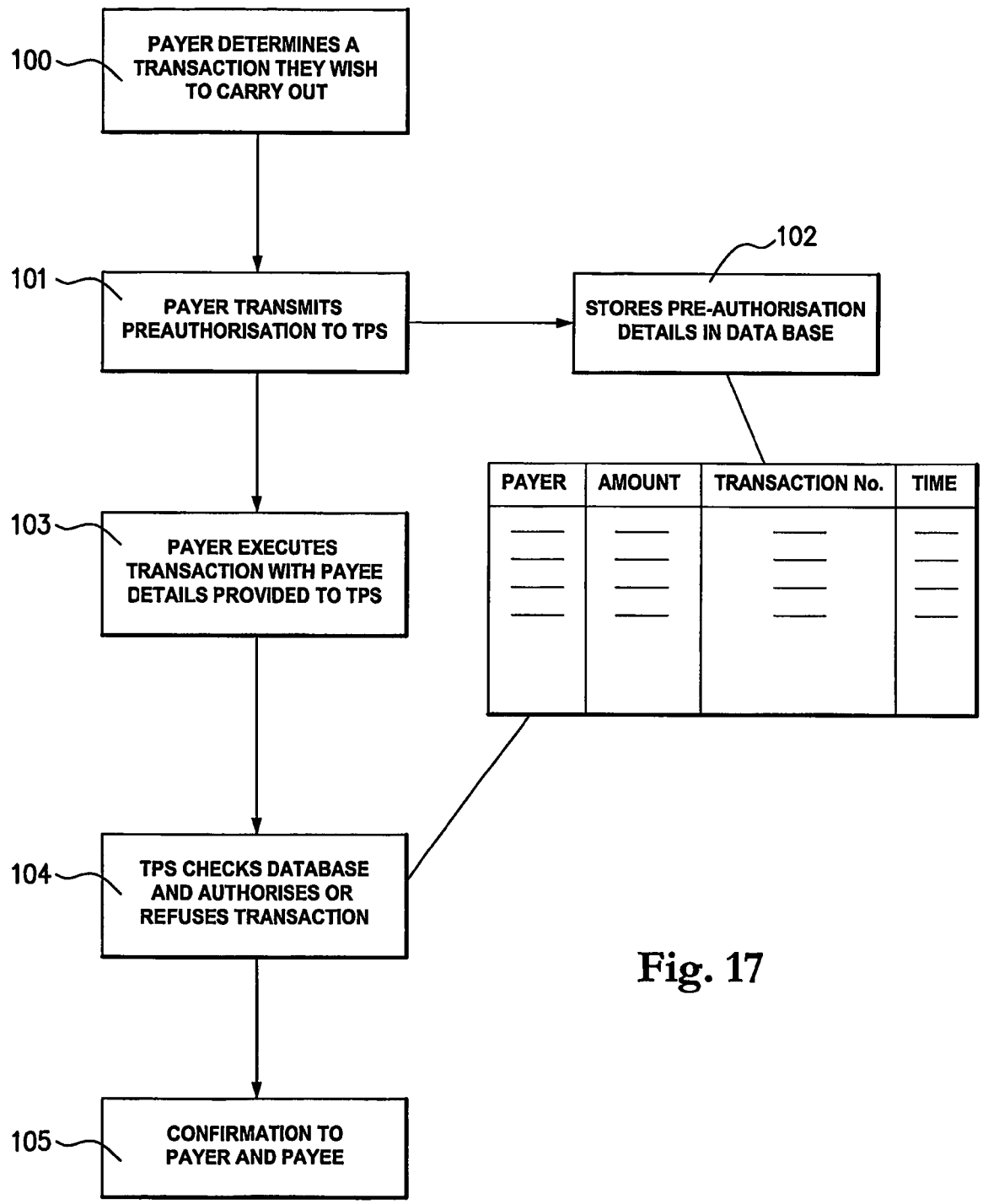
FIG. 17 is a flow diagram showing a process in accordance with a further embodiment of the present invention.

FIG. 17 illustrates a transaction process which utilises a pre-approval process in accordance with an embodiment of the present invention. Using a payer electronic device, in this embodiment a payer may pre-approve payment for transactions which they have not yet undertaken. This may be particularly useful for a number of transaction types or situations. For example, in card-not-present transactions, such as payments over the Internet. In accordance with this embodiment, a payer transmits a pre-approval message to TPS 2 including pre-approval instructions. The pre-approval instructions may include details for identification of the transaction which is subsequently to take place. The details may include, for example, a quantum of payment which is to be made. The payer then executes the for example Internet transaction, but before the transaction payment is made the TPS 2 checks the pre-approval details against the transaction details. The TPS 2 can then confirm or deny the payment, depending on matching of the details.

In more detail, with reference to FIG. 17, at Step 100 a payer determines a transaction they wish to carry out. The transaction may be an Internet transaction, for example. The payer may require purchase of an item from a merchant Internet website. The payer will therefore be able to determine details of the transaction, such as a payment amount that the merchant might require to provide the goods/services on offer.

At Step 101, the payer transmits pre-approval instructions to the TPS. The pre-approval instructions include details of the transaction which the TPS can use to confirm or deny the subsequent transaction. Details may include any details which enable identification and authorisation of the transaction. For example, they may include a payment amount for the transaction.

At Step 102, the TPS stores the pre-approval in a database. The database may include "payer" information identifying the payer, an "amount" information including details of the amount of the payment for pre-authorisation, a "transaction number" and "time" which may include a time during which the transaction will take place. Once the "time" has expired, the TPS may not subsequently approve the transaction.

At Step 103, the payer undertakes the transaction in the usual manner. For example, where the transaction is an Internet transaction, the payer may enter credit card details on a web page of the merchant website provided for receiving such details. The details will also include a payment which may be entered by the payer or automatically entered by the merchant. These transaction details are then provided to the TPS.

They may be provided in numerous ways. For example, they may be provided by the usual transmission via the merchant system to the TPS.

At Step 104, the TPS checks the received transaction details against the pre-approval details in the database and then authorises (or not) the transaction, depending upon matching of the details. Confirmation (Step 105) may then be sent to the payer and payee. Confirmation to the payer may be by SMS message, for example.

If during the approval process the TPS requires further confirmation, they may engage in a method such as described above in relation to the earlier figures. Alternatively or additionally, they may engage in an SMS message exchange or even a phone call with a payer electronic device.

As discussed above, this embodiment is particularly useful in providing an extra authorisation step for card-not-present transactions.

This embodiment may also be useful for card-present transactions as an added layer of security. Further, previous embodiments of the invention described above, rely on there being open communication channels between the electronic device of the payer and the TPS for the transaction to take place. If these communication channels are not open at the time of the card-present transaction, (for example, the payer electronic device is a mobile phone which is out of range of an appropriate transmitter), then the transaction will not be authorised. This embodiment of the present invention allows the option for pre-approval following a failed transaction. If the failure occurs, the payer then finds a location where there is an open communication channel between their payer device and the TPS, and provides pre-approval details. They then return to implement the transaction at the location where there are no communication channels. The transaction then proceeds as discussed above, the TPS comparing the pre-approval details with the details of the transaction, in order to enable the transaction, even though the electronic device of the payer is out of communication.

In the case of a failed transaction such as this, the system may already have been provided with information about the transaction from the merchant. That is, because the transaction was attempted to be implemented but failed because the persons phone was out of contact, some transaction information will already have been provided to the TPS. In this embodiment, the TPS may continue to try and contact the payer's device until the payer is in range. When the payer is in range and contact is established, the authoriser body may provide the transaction information to the payer device and the payer merely needs to confirm that the transaction information is correct. The payer then subsequently returns to the merchant, engages in the transaction again, and this time the transaction goes through because of the stored pre-authorisation that the payer entered by confirming the transaction details with the authoriser body.

For card-not-present transactions, it is often the case that a merchant will provide transaction details to a financial institution and ask them to conform that the payer has sufficient funds to pay, and freeze those funds, before issuing an order to provide the goods to the payer. Only subsequent to that will the transaction go through. In one embodiment, this merchant pre-approval information may be used by the TPS to contact an electronic device associated with a payer and ask the payer to confirm that the transaction is authorised. The transaction may be identified by some transaction details such as the amount of payment. Once the payer has authorised the payment, then the transaction can subsequently be processed. Details of the transaction may be held in the database until it actually occurs.

A similar pre-approval system could be used for on-line payment from one person to another.

Another circumstance where this embodiment is useful is for periodic payments. That is, payments that may occur monthly to a payer. A pre-approval may be stored in a database along with a transaction time, (for example the time of the month that the payment should take place) and the TPS will check the pre-approval details every time they receive a payment request from the payee. This provides an extra level of security for periodic payments. It may also prevent payments being taken out more often than agreed.

In a further embodiment, a passive device for providing information to a PD 1 may include information about the application that the passive device is intended for. For example, where the passive device is a barcode, it may include information relating to the application that is required to run on the PD device 1 in order to enable the barcode information to be processed.

Figure 18:
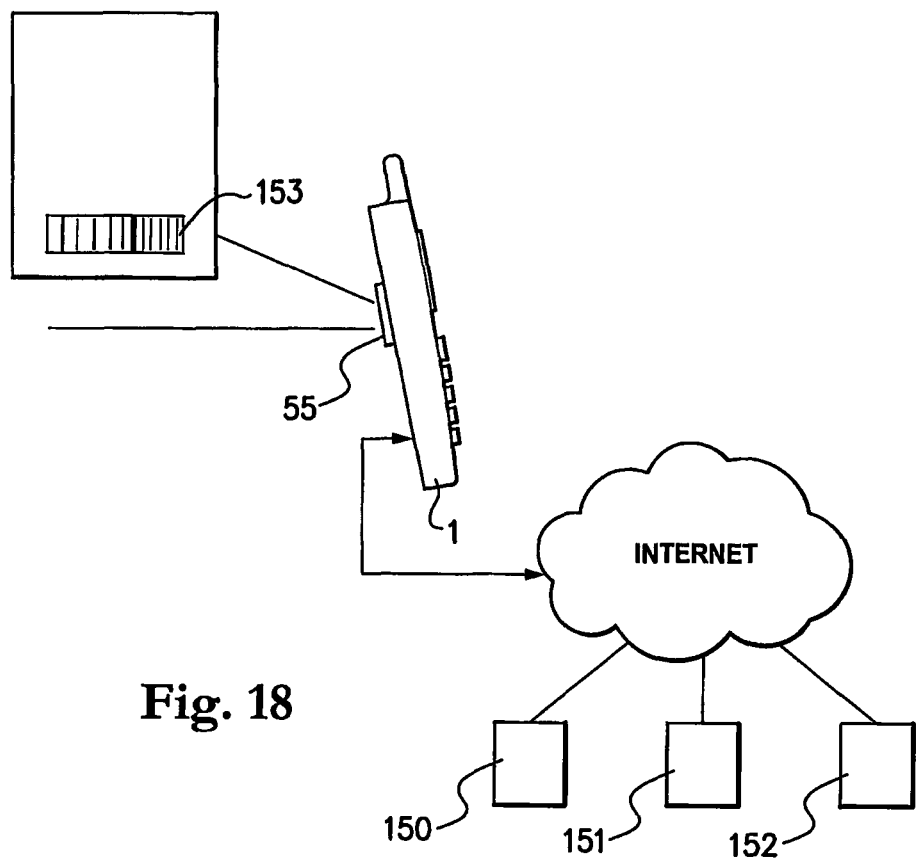
FIG. 18 is a block diagram showing application of a system in accordance with yet a further embodiment of the present invention.

Referring to FIG. 18, a number of different payment processing applications may be provided which are arranged to run on PD 1. For example, payment processing application 150 may be arranged particularly for payment processing for parking meters. Another 151 may be arranged to process payments for bills and another 152 restaurants. In yet a further embodiment, the applications may not relate to payment processing at all, but have other functions. For example, one application may be a business card application enabling a PD 1 to upload and process business card information.

The advantage of this system is that having information about the barcode in the barcode itself enables the PD 1 to obtain the correct application or identify the application if it is already on the phone. Where it is necessary for the PD 1 to obtain the application, the barcode may provide location information e.g. location of an Internet node, from which the application may be obtained.

The passive device is not limited to barcode 153, although this is easily obtainable with conventional phone technology cameras 55, but could be any other type of passive device. Applications may be stored at a database accessible over a network such as the Internet.

Figure 19:
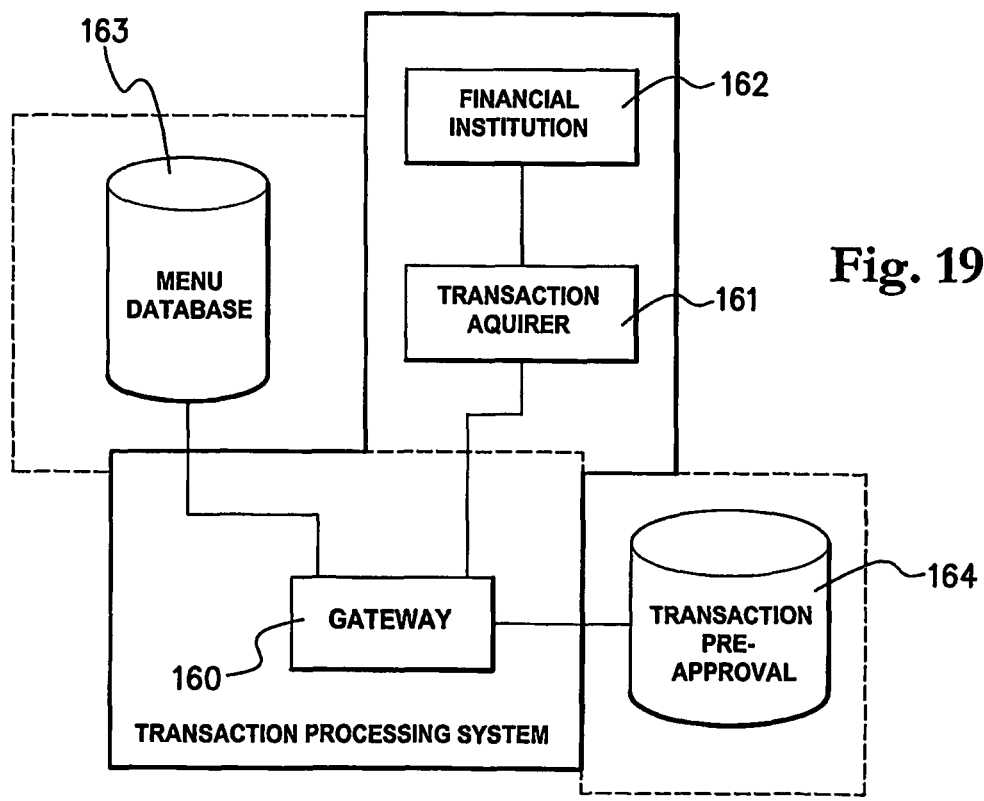
FIG. 19 is a more detailed block diagram showing components that may be involved in a transaction processing system in accordance with an embodiment of the present invention.

FIG. 19 illustrates potential elements of a transaction processing system 2. In one embodiment, the transaction processing system 2 may comprise a gateway 160 which may include systems for communicating with payer devices and payee devices and also systems for communicating with "back end" processors. A conventional transaction will normally require a merchant device communicating with a payment gateway administered by a transaction acquirer 161, who then subsequently communicates with a financial institution 162 (which may be a issuing bank) to determine whether or not to authorise payment. The transaction acquirer 161 will then usually provide authorisation or denial to a payee device. The TPS of embodiments of the present invention may indeed merely be a transaction acquirer 161 with the appropriate systems, or may be a separate body running a gateway 160 and providing the information to the transaction acquirer from the merchant device or payer device. The gateway may also run a "universal shopping database" 163 which enables a payer device to upload menus as discussed in relation to the above embodiments and also a transaction pre-approval database 164 which enables a payer to download pre-approvals via the gateway.

The TPS may include organisations carrying out all of these functions separately or all of them together or various parts of them in any combination.

The transaction processing system may be implemented by appropriate software and hardware (usually server computers).

Figure 20:
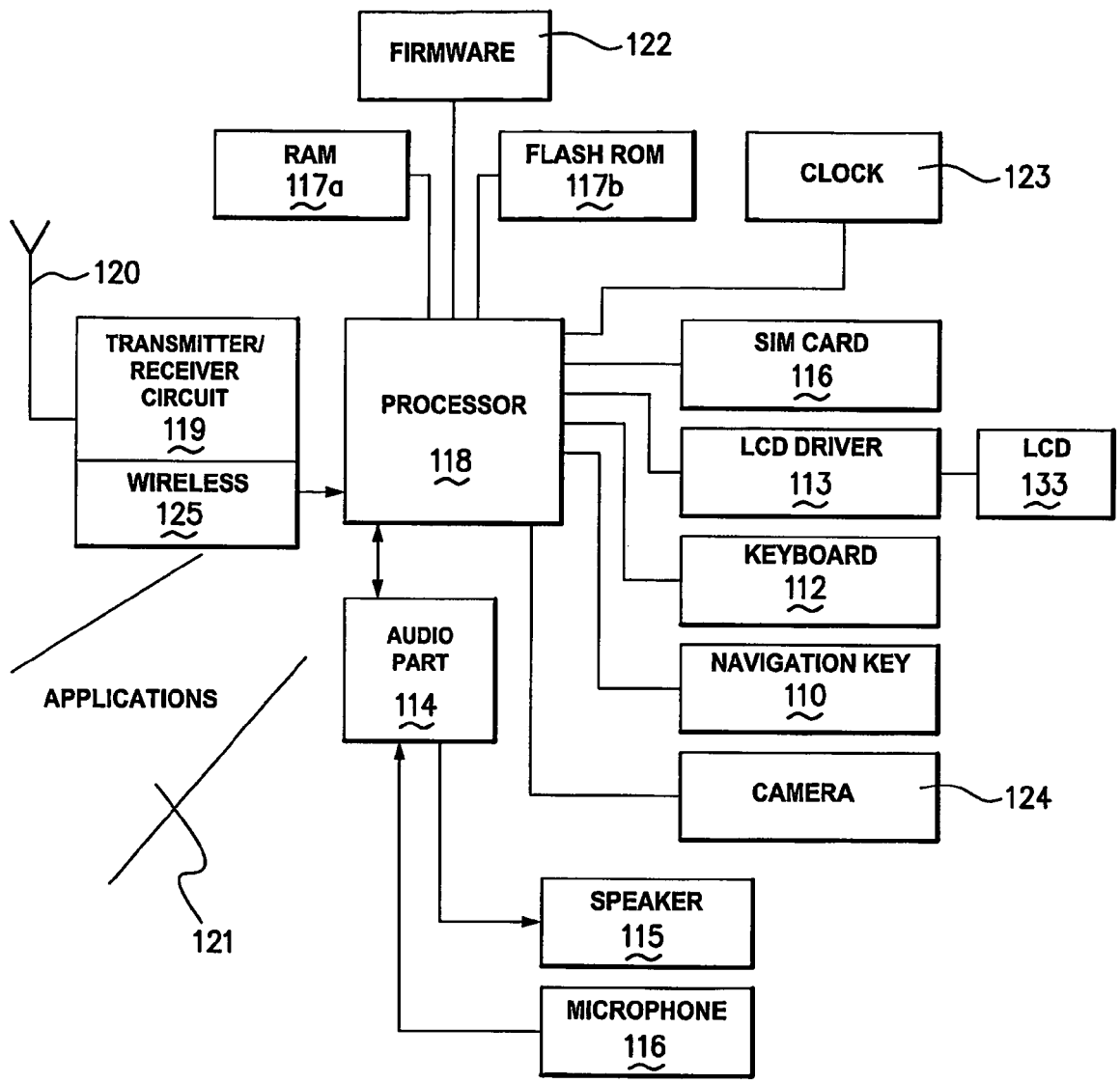
FIG. 20 is a block diagram of a payer electronic device in accordance with an embodiment of the present invention.

FIG. 20 is a block diagram of components for modified mobile telephone which may be used to implement a payer device in accordance with an embodiment of the present invention. Much of the functionality that is discussed in preceding sections of this document may be implemented by software loaded in the form of applications 121 onto the mobile phone. These applications will include the payment applications to enable appropriate messages to be prepared. Via these applications, a mobile phone may be configured to recognise payment information. This is generally something that cannot be done by standard computing devices.

Consider the world wide web as a parallel. The world wide web constitutes a universal browsing data base. The web comprises a system where a "request" combining a description of a "site" and additional location information within the site (known as a URL) can be used to retrieve information that is in a universal format allowing a computer arranged to work with the format to display text, graphics and links and work with these text graphics and links.

Currently it is possible for a person to shop over the web, but there is no system allowing a computer to shop over the web. The language of the web (html) specifies tags to allow a computer to recognize and display a heading, to recognize and display a link etc. but not to recognize an item code or price. The user of the computer must read the information on the screen and determine if an item description or price is present.

The applications 121 may include an application enabling the payer device to recognise and work with payment information. As discussed in proceeding embodiments, one proposed embodiment includes a "universal shopping database". For such a database, requests may specifically have codes identifying businesses offering products for sale and in place of resulting in a display page two type of requests are required:

1. a request to obtain descriptions and prices of items for sale in a format facilitating automatic processing and in a universal format such that a computer can automatically create a table of prices and descriptions from every response. This request is known as a "menu request"; and 2. a universal request to buy an item, or collection of items as obtained from a previous "menu request".

An example of shopping on the web using conventional language of the web (html) would be as follows:

```
Request = www.sampleshop.com/buypage.html
Response =
<IDOCTYPE HTML PUBLIC "-//W3C//DTD HTML 4.01
Transitional//EN"
"http://www.w3.org/TR/html4/loose.dtd">
<html>
<head>
<meta http-equiv="Content-Type" content="text/html;
charset=iso-8859-1">
<title>Untitled Document</title>
</head>
<body>
<h2>Welcome to the shop!</h2>
<p>Click <a href="buywidget.html">here</a>
to buy a widget for $50!</p>
<p> </p>
</body>
</html>
```

The web browsing program uses the tags to process the information that is relevant to web browsing e.g. that the text between the <h2> and </h2> tags is a heading.

The fact that a "widget" has a price of $50 is not relevant to the web browser.

By contrast, using the proposed "world-wide shop format" the request would look like:

"store=1234,menu=a"

and the response

<itemID>1567<itemDesc>Widget<price>5000

The response needs to be read by a "shopping program" in place of a "web browsing program". In this case how to display the information is up to the "shopping program". However the program is aware that an item is offered for sale at a price. If the user elects to buy the item, the program is aware an item is being purchased.

This has the advantage that the security needed to make a purchase can be automatically applied by the program and a history of purchases can be kept automatically.

Other applications 121 enabling the phone to read barcodes (or other passive devices) may also be loaded.

Further, firmware 122 may be implemented in order to further add to security as discussed above (and further exemplified later on in this description).

The adapted telephone includes a transmitter/receiver 119, a processor 118, a SIM card 116, a clock 123, RAM 117a, flash ROM 117b, an LCD display 133 and driver 130, keyboard 112, navigation key 110, camera 124, speaker 115, microphone 116 and an A-D converter 114. It also includes an antenna 120. A wireless module 125 (e.g. Bluetooth or general packet radio services (GEPRS) is included).

The hardware may also include a security module that is capable of identifying a user using a key encryption method. The security module is arranged for a public cyrtosis and such is the system defined by Rivest, Shamir and Adleman (RSA) or electric curve encrypting methods. As the device is a mobile telephone it comprises a SIM any variation of this embodiment, the SIM is arranged to function as a security module.

The payer device may not include all the components described above for implementation of embodiments of the present invention. For some embodiments, for example, such as pre-approval, it is not necessary to have an access means or firmware. In other embodiments, in order to provide an extra layer of security, firmware only may be provided without an access device. Access device and firmware, provide four layers of security.

To summarise, the system can be implemented by electronic devices associated with payers, such as mobile phones, with essentially three levels of implementation:

1. Standard mobile phones, with or without a JAVA or another application to make it more user friendly. The basis of the system at this level is that without a secure mobile phone, security must be additional to existing security. At this level pre-approval approval for transactions can be implemented for example by simple SMS messages.

2. A system "secured" mobile telephone. Utilising firmware protected from virus attacks to provide a signature system, software to handle incoming messages from the system. Signatures and PIN pads may be replaced by approval using the mobile phone for all transactions.

3. Contact and contactless ID launching payments (access device) and the mobile phone use is the primary communications device for the transaction.

Note that the payer electronic device may not comprise a modified mobile telephone. It could comprise any other computing device (preferably portable), such as a PDA. It could even comprise a dedicated device specifically built as a payer electronic device.

The term "electronic device" should not be considered limited to devices that operate only or wholly by electronic means. Any type of processing device (e.g. devices which may be implemented using optical transmission) may be utilised with the present invention as payer devices and/or payee devices.

Another embodiment of the present invention may be utilised to avoid a payer having to cue. The payer device registers a person (the payer) as on the cue via a system which sends a signal either direct to the phone or via a server. Alternatively, when the phone is placed on the cue the phone can periodically pole the cue the status in order to inform the user of the current status. This can be used in any cue to advise a payer when an order is ready. Either cue cue-code, or an electronically read via contact list or other electronic means or optically read using camera (barcode). The system then provides continuous status updates of what number is at the head of the cue so that the phone can display the last few numbers served before you. The system comprises a cue database and means for advising the phone where they are in the cue. A payer device may therefore order ahead and advise the payer when the order is ready to be picked up.

Further examples of embodiments of the present invention will now be described.

The improved payment system of this invention takes advantage of the fact that the majority of consumers in many markets are bringing their own computing device (usually a mobile telephone) to the point of sales. Low cost modifications to that device can enable a new system of payment that not only addresses the security problems with the current system, but also brings new many additional new features.

With this new system, merchants will advantageously have new improved ways of accepting transactions. Banks may be able to reduce or eliminate expensive charge backs and increase customer confidence. Mobile telephone companies have a new "killer:" application for mobile phones.

The system of embodiments of the invention utilises a modified consumer electronic computer in the form of a mobile phone or pocket computer that has been 'upgraded' to be able to operate in any location that has wireless coverage. The system proposes that all transactions include obtaining verification from the consumer (payer) using this upgraded device. In this manner all transactions are verified by the consumer. Real time transactions such as at a point of sale, over the phone purchases or Internet purchases can be verified at the time.

Any background periodic payments such as bill payments would have an overall approval at the time setting up the payment and in this example allows a period of 24 hours for any subsequent additional approval if such is required to cover situation where the consumer is asleep or not contactable at the time of the transaction.

The payment system considers what changes are required to the mobile phone or pocket computer to allow secure and simple use for verification of payment transactions.

Additionally, consideration is given to changes to the rest of the payment system that are required for optimal operation and to take advantage of the opportunities presented when such a device is part of the system.

The mobile phone or pocket computer is in this example capable of being contacted wirelessly in the majority of cases at the time when the consumer is making a purchase.

Upgrading the device for optional operation would require the device be equipped with:
  a wireless data communication system such as GPRS or Bluetooth
  software and/or firmware to facilitate the payment verification
  a security module capable of "signing" transactions using public key encryption methods
  a contactless smart card. The device is also be capable of being programmed for the payment functionality either prior to supply to the consumer or in the field.
  NOTE: Although the device is referred to as a PINpad, the use of a PIN is not a necessity.

The contactless smart card is supplied to the consumer by a principle of the payment system. Contactless smart cards are well known devices, often used in transport systems. The typical characteristics of the contactless smart card is that it is powered and "read" (actually communicated with) by a device referred to as a contactless smart card reader from a distance of zero to 10 centimeters.

In the preferred embodiment of the system, the consumer attaches his contactless smart card to the back of his mobile phone in such a way as to not interfere with any cameras, battery cover or other functionality of the phone (or pocket computer). It is not necessary for any electrical connection between the card and the consumer device. Physically attaching the card is for convenience and to keep the card and device together.

Initiating Payments in the System According to Embodiments

Updated Payment Points

To initiate a payment at a payment point equipped for the new system, the consumer touches the pocket-PINpad to the specially marked reader at the point of payment to indicate his/her desire to pay using this system.

The contactless smart card (as attached to the phone or pocket computer) passes details to the point of payment to enable further communication between the two devices at a greater distance. Now the that the point of payment has obtained details of how to contact the pocket-PINpad the consumer now need only remain within range of the wireless communication inbuilt into his pocket-PINpad.

Legacy Payment Points

An optional feature of system is the ability to offer the new payment system, even at payment points which have not been updated to accept the new system.

To offer the system at these existing payment points—the consumer's bank activates the system in the background.

In this instance the consumer's regular credit card may be offered at the point of sale, and the transaction proceeds as a traditional transaction. When the payment request reaches the consumers bank, the bank will send the payment approval request direct to the consumer's mobile phone. Once the consumer approves the transaction an approval message is returned to the bank and the transaction is authorised all the way back to the merchant's terminal.

The Improved Payment Transaction

Having obtained from the card the details on what wireless systems are available to use to contact the pocket-PINpad (e.g. Bluetooth or GPRS) and any information required to send information to the correct pocket-PINpad (e.g. Bluetooth ID for Bluetooth Connection or in case of GPRS, the phone number). The payment equipment sends the amount of the transaction to the pocket-PINpad and the store details for payment.

Some transactions will allow the consumer to vary the amount. After any amount variation, the consumer optionally enters his pin or simply indicates "ok" and the pocket-PINpad electronically "signs" the transaction to indicate the consumers consent to the transaction.

The transaction is then sent to the bank. The bank processes the transaction and sends a record of the transaction back to both consumer and merchant device.

Upon the merchant device receiving the record of the completed transaction the device signals to either the store salesperson or vending machine that payment is complete Retail, Point of Sale, Card Based Systems Most of us are familiar with credit and debit cards. Two types of cards are in use worldwide:

magnetic stripe based cards; and

"smart cards" with computer chips.

From an operational point of view payment with both card types is similar. The steps to payment are generally as follows:

1. Payment Steps—Card Given to Merchant

The consumer offers the card to the merchant.

The merchant uses the card in a payment terminal.

Merchant enters payment details.

If a pin is required is entered on a pin entry device.

A Transaction is sent to the bank by the merchant's payment equipment.

Bank reply is indicated on the merchant payment device.

For Non-pin transactions a customer signature is obtained and is retained by the merchant.

In variation on the payment process in place of the consumer hand his card to the merchant, the consumer enters his own card into a reader designed to be operated by the consumer. This variation attempts to reduce some security problems in the process, by reducing the risk of the merchant talking charge of the card and thus being able to copy the consumer's card.

Generally speaking, the process has several problems.

Problem 1—Equipment Variations

With the payment equipment installed at point of payment, the merchant has full opportunity to learn how to operate the equipment, and to detect any tampering with the equipment should it occur. The consumer however, is faced with potentially completely different equipment at each point of sale. This causes the following problems:

Self service payment points are slow and confusing to operate as consumers familiarise themselves with equipment Any steps of the transaction which for security reasons should be performed by the consumer will face the barrier of the consumer dealing with unfamiliar equipment. This results in merchants performing the steps such as card swipe and account selection, rather than explaining operation to the consumer.

Substituted equipment can easily be used by any unscrupulous merchant to collect pin and card details.

Problem 2—Transaction Signing

Various methods have been proposed to have the consumer "sign" the transaction to indicate willing participation.

Written Signatures

It would require unreasonable skill on the part of the merchant to reliably detect problems in a written signature at the time of the transaction. Filing and storing these written signatures also represents an unreasonable burden on the merchant. Presenting the card for signature verification also forces the consumer to surrender control of his card.

Electronic PINs Verified by the Bank (or Financial Institution)

PINs entered into the merchant equipment may be easily captured by merchant substituted equipment. This can allow a serious attack on an individuals finances.

Electronic PINs Verified by Smart Card

By verifying the PIN with the consumers card, risks from stolen pins can be greatly reduced. Unfortunately, this system is not in place in sufficiently wide use.

Problem 3—Card Copying

The ability of a card to be copied is a major flaw in the current card payment system. Magnetic stripe cards are easily copied on relatively inexpensive equipment.

Whilst smart card transactions do in theory almost eliminate the problem of card copying, smart cards also contain magnetic details and many merchants around the world can accept the magnetic details alone. Any time a card is presented the magnetic details can still be copied and used for fraudulent transactions around the world.

Problem 4—Repeat Transaction and Amount Frauds

There are various ways in which a merchant may multiple charge a card or charge an amount other then consumer has agreed. Small amounts may go unnoticed yet cost the consumer. Whilst large amounts will be detected. When the statement arrives the merchant may have fled already. Whilst these are not the worst problems in the system today, closing down other loopholes while leaving these problems open would see a significant increase in these problem.

Problem 5—Tipping

Many transactions allow an optional tip component. The only practical solution to tips with cards used in merchant terminal is for the tip to be added after the bank has approved the transaction.

Having the consumer enter his tip onto the merchants machine is impractical.

The provision for the merchant to add a tip to a completed transaction introduces weakness in the system. If a merchant was to incorrectly add a larger tip, what recourse does the consumer have? First, the consumer must detect the problem. Then there is the problematic issue of chasing the transaction and forcing the merchant to produce the original signed receipt. Expensive and painful for all. Whilst systematic skimming by a merchant would eventually be discovered, many consumers would still be left with the extra expense after the problem is discovered (and potentially the problem staff member long gone!).

Internet Payment Systems

Two types of Internet based payment are practical today.

1. Truly Secure Internet Payment

Truly secure Internet payment has been often proposed, but rarely implemented. Firstly, secure Internet payment requires a smart card and consumers don't have the card. The SET by MasterCard, Visa etc was one of the first well promoted systems using a smart card. Secondly, to be truly secure, an accessory to the PC is required to not only read the smart card, but to display the amount to be spent and accept a PIN to sign the transaction. Such systems are well known (see FINREAD) for example.

The smart card is used to provide a secure, non-reusable, digital signature to the transaction. Since worms and Viruses make the information on the main computer display open to alteration and capture by remote parties a separate secure console is required for payment. The PIN pad on the console is used to instruct smart card to create the digital signature for the amount securely displayed on the console.

Such a transaction is as secure as possible today. To create a transaction you need both the original smart card and PIN. Obtaining a copy of the card is not feasible in reality.

The problem is, most people don't have FINREAD style attachments to their PC, nor the digital certificates on a smart card to use them. Just to secure a persons Internet transactions, the system is currently difficult to cost justify.

To get around this problem card associations such as American Express and Visa offer varying alternatives.

American Express's Personal Payments solution requires the American Express cardholder to first log on to the American Express site, 'pre-allocate' the payment amount and received an id for this allocation. The cardholder can then use this id to purchase goods at Internet merchant sites linked to American Express Personal Payments. This approach has the advantage of the card number not being used for the purchase transaction but is rather cumbersome for the cardholder to use and to date has not been popular for merchants to implement.

In Visa International's 3D-Secure solution the cardholder still enters their card number but only when the issuer, rather than the merchant, requests it. The solution relies on well-established SSL/TLS technologies to secure the links between all the parties involved in the transaction. Due to the complexities involved this solution may only prove appealing for larger merchants.

2. Mainstream 'Secured' Internet Payment

Mainstream 'secure' Internet payment simply means that the payment details are securely transmitted over the Internet. Whilst intermediaries cannot intercept the card number used, the Internet merchant themselves must be taken on trust to keep the number they receive secret, charge the correct amount and bill only on the occasion specified. The merchant receiving those payment details cannot determine with certainty who sent the payment details.

Basically the consumer must take it on faith to trust the merchant, and whilst the merchant add protection such as checking where goods delivered and having signatures for receipt of delivery it is expensive to the merchant. Where goods are delivered electronically it becomes even more difficult to add any protection for the merchant, and as a result there is a high cost of fraud in such transactions.

Advantages of the System of the Above Described Embodiment

If a new infrastructure for the system of this embodiment could be deployed tomorrow, security and transaction costs could be lowered. The new payment system delivers the benefits to consumers, merchants and banks to justify the rollout of a new system.

Security

The solution according to this example of the present invention delivers the highest level of fraud protection available today. Purchases have the same protection as a FINREAD style Internet transaction. It is as if the consumer is bringing an Internet terminal and smart card reader to the point of sale.

Whilst it is true that many of the current security problems could be greatly reduced by universal introduction of smart cards, this example goes further and advantageously may even eradicate the problems still left behind by a move to smart cards.

Further protection is delivered by:
the security of being able to verify the amount of the purchase securely;
protection from tip and amount variations;
protection from multiple charging;
elimination of risk of even magnetic card level duplication;
ability to secure even 'legacy' transactions by allowing consumer verification of transactions at points of sale not equipped for the new system;
in all but legacy transactions, providing the merchant with proof of payment but not the consumers card details.

Cost

By utilising equipment the consumer is already prepared to pay for (for example a mobile telephone), the infrastructure of the improved system is at far lower cost.

The payment terminal can be considered to be "split into two"—part of the terminal being the mobile phone the consumer brings with him with the remaining merchant component greatly simplified and cost reduced.

This enables more payment points such as parking meters, vending machines and self service points in department stores.

Speed

By enabling the consumer to share the workload of the transaction on a familiar device, transaction speed may be improved in all situations. Self service payment enabled by the system will also allow consumers to pay immediately in place of queuing for service in many situations.

Not only can checkouts move faster, but customers in restaurants can bypass the entire extra step of having their card taken away for processing.

Flexibility

The new system brings a whole new level of possibilities to electronic payment.

New facilities include:

Delegated Payment

At time of payment, the consumer may nominate a parent or friend to make the payment on their behalf, as long as the nominated person is "only a phone call" away. This allows children other loved ones to have access to an emergency fund—but ensure the parent of other emergency fund supplier to monitor the use of such funds.

Split Payment

Ever been to a restaurant and had the situation of an account which should be split two three or even more ways? Resorting back to cash can seem the only solution currently. Although most restaurants will split an account two ways for payment by card, even then it is a messy solution. Each additional card or other complication makes communicating the wishes of the various card holders more difficult.

Each diner equipped with their own personal PINpad is able to make their own contribution with no explanation needing to be communicated to the restaurant at all.

Amount Variation

The amount presented to the consumer can not only be verified securely by the consumer—it can also be altered with parameters specified. This is particularly useful for tipping. The current system for tipping typically works only for credit card transactions. The transaction—without tip—is approved by the bank. After reading the tip amount written on the receipt by the consumer the merchant then processes a variation to the original transaction.

This is problematic for both consumer and merchant. For the merchant, the original transaction must be retrieved (in a busy restaurant several receipts could be out at tables at any one time) and the new amount entered.

For the consumer, no verification is possible of the actual final amount entered by the merchant and error due to a misread by the merchant, overcharging or any other factor is difficult to detect.

With the present embodiment the consumer can directly increase the amount to be paid on his own device—and the correct amount is processed in the first instance. No re-entry by the merchant is required. A source of error and doubt is completely eliminated.

Account Selection

A number of banking accounts can be linked to the payer device and selected as an alternative to the default account. The accounts need not be from the same bank.

The system of this embodiment also advantageously offers more convenience.

Self Service Payments

Self service payment points can avoid queues and offer goods and services at locations where it is otherwise impossible. Historically, paying at these self service payment points is either by coins (and sometimes banknotes). Where credit/debit cards are accepted either the customer or the service provider must pay for the cost of expensive equipment and telephone charges.

Paying by this system advantageously reduces these problems. Acceptance equipment is low cost and phone calls are not required. Best of all, the consumer is using the same payment device (in his own phone) instead of having to learn how to use new payment equipment at each point of payment. Reading instructions and difficult card readers become a thing of the past.

Choice of Accounts at all Payment Points

Current systems often restrict account types because of logistics. For example, entry of a pin may be problematic at a restaurant. With the payer device system this problem is eliminated as the enter pin request is delivered to the consumer at the table. No instructions need be given to the cashier nor any restriction on PIN entry.

The scenario of the merchant asking the account and then reaching across to save the consumer selecting the account on an unfamiliar device becomes a thing of the past.

Bill Verification

When bank statements arrive, the mobile phone is able to instantly reconcile the account balance of all electronic transactions verified through the system. This eliminates the worry of "am I being overcharged" or the alternative chore of reconciliation for the consumer.

Receipt Filing

With all transactions electronically signed, no paper receipts are required. This simplifies expense claims, tax records and other accounting for the consumer.

Eliminating the need to keep paper signatures as proof of the transaction is huge bonus for merchants.

Universal Application

The same verification system can be used for all payments—telephone orders, Internet, existing legacy payment systems at the point of sale as well as new improved low cost payment points.

The card issuer and the mobile operator need updated systems. Once this is in place each cardholder who participates can see immediate benefits. There is not need to wait for updated devices to reach merchants before the system is of value.

Equipment

Consumer Device

For the system the consumer device to be converted to a payer device requires a form of wireless communication (and in some embodiments does not require this). Currently three systems of wireless communication are in widespread use—802.11, Bluetooth and GSM+GPRS/CDMA.

In this example each device is deemed suitable to be equipped with a form of wireless communication which is capable of communication between the consumer at the majority of purchases points and the network. Examples today would be GSM with GPRS or CDMA mobile phone data communication. As widespread wireless protocols in use change over time so could the wireless system to be used.

This document discusses a system based on GSM+GPRS mobile phone optionally equipped in addition with Bluetooth communication.

New Software and Firmware

The software on the device in this embodiment should contain specific features not found in current phones.

Specifically:

The ability to receive a payment request command over any of the wireless systems enabled for payment in the device and pass this request to the SIM module.

The ability to display payment request messages from the SIM module and pass data entry back to the SIM module.

The ability to display a pin entry message in a manner that cannot be replicated by any applications loaded onto the phone.

Presentation of the answer to the payment approval message directly to the SIM.

The answer to the payment approval message is not able to be sent to the SIM by any application software Note that another processing module may be used instead of a SIM, but a SIM is preferable for the mobile phone embodiment.

From these requirements it follows that the payment approval message display and response should be implemented by Firmware. Preventing an application from generating the answer to the payment approval message ensures that no software worm or virus can be used to cause the phone (or other consumer device) to approve payments the consumer has not seen.

Re-loadable software may be used to implement any functions of the supplementary functions to payment approval screen provided that upon completion of that function the payment approval screen is guaranteed to show the amount which will be sent in the message to the SIM as the amount the consumer is approving to pay.

Contactless Smart Card

Contactless smart cards are well known. The preferred embodiment of the system equips each device with a contactless smart card in order to facilitate easy payment at a new style of payment point. The contactless smart card additionally can facilitate registration of the consumer device with the financial institution.

It is desirable to use contactless smart cards of as small size as possible whilst still allowing for any necessary antennae within the card. It is also desirable to use a flexible rather than rigid material for the card to enable the card to adhere to the contours of the case of the consumer device.

It is desired that the card be capable of securely and uniquely recording the presence of the card at the point of sale. This requires the card contain an encryption key which is used to sign a message from the contactless payment reader.

The contactless smart card should also be capable of conveying the information necessary for communication with the payer device associated with the card. Such information would include the Bluetooth ID of any Bluetooth module incorporated into the consumer device as well as the phone number to enable communication with the wireless module of the device.

The contactless card is also capable of conveying to a reader the capabilities (e.g. Bluetooth—no Bluetooth, GSM-GPRS or CDMA etc) of the matching consumer device.

The contactless card is also capable of sending the public keys of the matching security module (see below) to a reader as used by financial institutions in the case the public 'initialisation' key.

SIM or Security Module

To be certain the transaction has reached the correct device it is desirable to able to encrypt data using keys the financial institution can verify as belonging to the cardholder. Such systems are well known and have been proposed in almost all smart card based payment systems. In the case of GSM mobile telephones, as security module is already present. All that is required is that the SIM in the phone is capable of meeting the requirements specified here—or is replaced with a SIM that is capable of meeting these requirements.

In the preferred embodiment the SIM in the GSM phone are equipped with secure storage for encryption keys for financial transactions and for the encryption algorithms to match. Well known encryption standards such as RSA or elliptical curve are suitable. Such systems make use of a pair of keys with one key "private" (held secretly and securely in the consumer card) and one key public. Data encrypted with one key can be decrypted with the other. Simply put—and one can send data to the card by encrypting the data with the private key with confidence that only the card with the matching private key can be used to decrypt the data. Conversely, any data which correctly decrypts with the public key has originated from the card with the private key.

To allow financial institutions to install the keys for their cardholder onto an already issued SIM card a public/private "initialisation" key pair can be used. The private key held in the SIM card and the public key in the matching contactless smart card.

Bank Authorisation System

Each bank that issues debit or credit cards must ensure a system is maintained with a record of each cardholders' balance and approved minimum balance. This system is updated to send the payment approval message to the cardholders' payer device when the system is enabled.

The balance verification system formats the message and sends the message together with details by the system on the identification of the payer device.

The card holder may require a method of enabling and disabling the system to allow for travel outside the area where his payer device can communicate.

Mobile Phone Communication Gateway

A new communications system receives payment request from the card issuers and sends the requests to the payer devices. The system could consist of one integrated gateway system for all transaction types or individual gateway systems for one or two of the transactions, or could be added as new functions to existing gateways. The gateway should be capable of three transaction types:

initiating payment authorisation requests to send to payer devices;
responding to payments received from payer devices;
passing transactions that have been signed by payer devices at the point of sale through to the appropriate financial institution.

In the first two of these cases the gateway will act as the interface between the financial system and the payer device. The issuing bank will still need to approve the transaction. In the third case the financial institution that receives the approved transaction will typically be the acquiring bank.

Note the traditional roles of issuers, acquirers and card associations (e.g. Visa) can be reviewed upon implementation of the preferred solution.

Cards

For a long time to come there will be legacy payment points requiring a existing style magnetic card to initiate a transaction. Lower transaction cost for new style transaction points will encourage their addition to points of sale over time but the system still gives full protection at current card based points of sale without any updating being required.

It is possible to issue new cards which are not linked to a specific bank account.

Payment Devices

Existing electronic payment acceptance devices can work with the system unchanged—but do not take advantage of the new facilities offered.

Some devices already take instructions from the bank on a card by card basis as to whether to request a PIN or signature. It is recommended to link the system to an existing signature card—or a new payment card issued for the purpose—rather than a pin based card.

Even minor alterations to configuration or programming will streamline transactions made using payer devices. Further benefits can be obtained when using the system with reprogrammed devices and even further benefits with a new generation of payment devices.

A payer device in one embodiment may have three types of wireless communication for flexible operation:

Extremely short range (approximately 10 cm maximum) wireless communication used to initiate transactions.

Local area wireless communication to communicate with the point of payment (or payment terminal) throughout the transaction.

Global range wireless communication to enable communication between the payer device and the banks that consumer holds account with, regardless of where the consumer travels globally, or at least in as many locations as possible.

The payment system is capable of operation in a version which does not require all the above described system to be implemented. The proposal is to allow current mobile phones or pocket computers with wireless telephone modems to easily and at low cost be converted into a workable payer device.

Single Type of Wireless Communication Only

One example payer device includes only one type of wireless communication. Either local area to allow communication with the point of payment or long range to allow direct communication with the financial institution where accounts are held would be technically sufficient.

Such devices could effectively communicate with the financial institution through the point of payment or to the point of payment through the financial institution.

These devices would be effectively suitable for securing legacy transactions, since no convenient means of initiating a transaction is incorporated.

Short+Local Wireless PINpads

A device with short range and local wireless communication could both initiate transactions and execute transactions at any point of payment equipped that is equipped with all three types of wireless communication.

Short+Long Range Wireless Payer Devices

Long range wireless devices, using either dedicated data networks or mobile telephone networks, are in widespread use and can easily have short range wireless communication added.

Complete System Payer Devices

Take any mobile phone which is also equipped with Bluetooth (or has the ability to be equipped with Bluetooth), add the necessary firmware and package with an appropriate SIM and contactless smart card and you have a versatile payer device. Since mobile phone system operators have the ability to request phone makers to add firmware and access to SIMs and contactless smartcards—deployment of these devices requires only a motivated mobile telephone system operator.

Integrated Complete System Payer Devices

As an upgrade to the 'complete system' payer device, short range wireless could be integrated into payer devices at production time. This would enable the payer device to not only send data at short range, but also to receive data. Such capability would make direct, person to person payment far more flexible.

Payment Transaction Types

Legacy Transactions Utilising Payer Devices

A legacy transaction using a payer device proceeds as a normal credit card transaction until the transaction approval centre for the legacy card issuing organisation receives the transaction. At that point the payment approval request is sent to the payer device.

Once the payer device receives the transaction, the consumer may select his account of choice where offered and either approve or reject the transaction.

The response of the consumer is sent back through the gateway to the approval centre—which in turn processes the transaction and sends the result back through the legacy system. The result of the transaction is also send through the gateway to the payer device for filing by the consumer and as an electronic consumer receipt.

Short+Long Range Wireless Payer Device Transactions

Where the point of payment is specifically equipped for payer device transactions, the consumer indicates his willingness to pay by touching his smart card to the point of payment, instead of using a legacy credit or debit card. The merchant should have already entered the amount to be paid (or scale of payment for variable amount transactions) into the point of payment equipment.

The transaction request for approval is assembled by the point of payment equipment should be sent directly to the payer device gateway. The payer device is again used by the consumer to modify and or approve the transaction and the result is sent now from the payer device back to the gateway which sends information from the point of payment together with the answer from the payer device to the financial transaction approval network. The result of the transaction is sent back both to the point of payment and to the payer device to provide an electronic receipt for both devices.

Local Wireless Transactions for Complete Payer Devices

For some foreseeable time, points of payment which currently accept legacy card payments will continue to do so. When also equipped for payer device transactions, these points of payment can deliver faster transactions for payer device transactions than for legacy transactions, with less effort by sales staff. The ability to process legacy transactions requires the point of payment to be equipped with a communication link to a financial transaction approval centre.

When the point of payment equipped for payer devices detects a device with local wireless capability, the point of payment can send the payment approval request directly to the payer device over the local Network.

When the payer device receives the payment approval request over the local network it first allows the consumer to alter and or approve the payment approval request. The payer device then checks the request to determine whether to send the transaction directly through to the payer device gateway—or back to the point of payment through the local wireless connection to the point of payment. In this case the transaction is sent back to the point of payment.

The point of payment then sends the transaction through the same network used for approving legacy transactions. Upon receiving the response to the transaction, the point of payment relays the transaction result to the payer device to provide a an electronic receipt to the consumer.

Long Range Wireless Transactions for Complete Payer Devices

At locations where electronic transactions have not be previously been offered, or in some cases even where legacy transactions are accepted, it may be desirable to provide a low cost payment acceptance point that has no long range (no modem or telephone for example) communication of its own.

In this situation, the payer device can be used to send the transaction for processing and to receive the result.

Local wireless transactions for complete payer devices with the exception that the payer device is responsible for sending the transaction for approval by my means of the payer device gateway and the payer device sends the electronic record or the transaction to the point of payment, both to provide a record of the transaction and to allow the merchant to recognise payment by the consumer.

System Security

Where does the security of the system come from? The SIM module (or other designated system processor) securely stores the keys to encrypt data and create digital signatures using well know techniques such as RSA. Each payment approval, sent from the phone is thus guaranteed to have been generated using that SIM module.

This leaves the only two possibilities for fraudulently generating a transaction the consumer does not agree to being 1) use of the phone or SIM by someone other than the consumer, or 2) the payer device being tampered with so as to produce authorisations to transactions without the consumer being aware of such occurrence.

PINs and Other Biometrics—Protecting Payer Device Theft

A PIN is merely one form of biometric. It exists in the memory of the user and by recalling this memory the user identifies himself as the person with this memory. Any form of biometric e.g. PIN, fingerprint, eye-scan, face recognition can be used by the system.

In a preferred embodiment, whatever biometric is in use (PIN, fingerprint, eye-scan etc) will be requested every time a preset amount has been reached, or for any transaction over that preset amount. For example, consider a preset amount of $100. Transactions less than $100 may occur until collectively these sequential transactions total in excess of $100. The first transaction bringing the total of consecutive non biometric transactions will require biometric verification.

| TRANSACTION AMOUNT | BIOMENTRIC REQUIRED | REASON |
| --- | --- | --- |
| $300 | Yes | Transaction greater than preset limit. |
| $10 | No | Only $10 spent since last biometric. |
| $50 | No | Only $60 spent since last biometric. |
| $60 | Yes | With this transaction $120 spent since last biometric. |
| $30 | No | Only 30 spent since last biometric. |
| $150 | Yes | Transaction greater than preset limit. |
| $80 | No | Only (including this transaction) $80 spent since last biometric. |

An important point is that the biometric should only be used by the SIM. The SIM verifies the biometric internally before proceeding to sign the transaction as being approved by the consumer. Whatever biometric is used should NOT be sent outside the payer device. Should a PIN be used this PIN should not match any PIN currently in use at ATMs etc. Whatever biometric is used is of no value to anyone who does not have access to the payer device.

The use of the biometric (PIN or otherwise) is to limit the amount that can be spent by anyone gaining access to the payer device without authorisation (although biometric use could be applied in other ways).

Firmware Protection

The principle of the system according to this example is that the user of the payer device must be certain that the data displayed on signature screen and accepted by the user is the only data that can be signed using the payer device.

This can be achieved through firmware in the device. The firmware is arranged such that a single firmware function:

1. displays the information to the user,
2. accepts the "OK" and PIN or other biometric, and
3. sends the data to the security module (usually a SIM) as displayed to the user.

Application software is prevented from performing Step 3 above without the exact same information as sent for encryption or digital signing being displayed to the user.

The firmware protects against software attacks to the payer device itself. Through the various wireless interfaces the device may be open to virus and worm attacks. The design is to ensure any interface supplied for application software for sending data to the SIM specifically prevents the "payment approval" message being sent to the SIM. Only the payment approval display routine can be capable of sending this response. This ensures the consumer sees, and physically presses at the minimum some form of "OK" button to approve each transaction.

The filter blocks application software directly issuing the "generate signature" command to the security module or SIM.

Setting Standards

There are many possible configurations of the system. For any deployment, a requirement is to determine which wireless and encryption standards are most applicable in the marketplace where the system is to be deployed. A problem caused by multiple standards globally is that when travelling to an area where, for example their own payer device cannot communicate due to differing standards, consumers face the option of 1) obtaining a payer device for the region they are travelling to, or 2) they may need to temporarily disable the system.

Currently GSM is the global system of choice however, for example, in Japan the iMode system would be the logical choice.

System Deployment

To initially deploy a system, at least one bank (or other card issuer) and one mobile telephone system operator cooperates to deploy the system.

Role of the Mobile Phone System Operator

The mobile phone operator sets standards and require at least one mobile phone supplier to incorporate the firmware as described.

The mobile phone operator then promotes the package of modified phone, SIM and matching contactless smartcards through retailers who sell phones and subscriptions to the service of the mobile phone operator.

The producer of SIMs to the mobile phone would have all knowledge to produce appropriate SIMs and contactless cards from the descriptions provided in this document. The network operator conveys these instructions to the SIM supplier and order the SIMs.

The mobile phone operator must provide the computer system (either directly or through a gateway operator) to receive payment approval requests and send them to their subscribers.

Role of the Card Issuer

The card issuer promotes the service to cardholders.

The retail branches of the issuer provides a service to initialise payer devices with the details of the cards held by the consumer.

Alternate Model Where the Phone Operator Becomes a Card Issuer

The mobile phone operator or an independent gateway utilised by the mobile phone operator could become a card issuer, without needing to provide debit or credit facilities. The cards issued would simply link to existing debit or credit account of the consumer, but would have the ability to link to accounts from multiple issuers.

The cards issued would have authorisation requests routed back to the gateway, thus saving card issuers from any new infrastructure.

In many countries the mobile phone operator also offers services and infrastructure to the card processing centres.

Payer Device Software

The following functions should be added to standard mobile phone or other pocket computer device to give rise to one embodiment of the present invention. For illustration details on implementation are limited to the preferred embodiment of a GSM mobile phone.

The Payment Screen

The payment screen should have a unique identifying characteristic that cannot be imitated by any new application software loaded into the device. For example the "pay line" having a solid red background and the firmware from the phone preventing a similar solid red banner being drawn by any application. This measure is to stop virus programs learning card PINs.

Software Components

The following components of software are required in the Payer device embodiment.

Payment request message from network.
Payment request message to SIM.
Payment request Data Entry Screen.
Payment request Screen data message to SIM.
Payment request response from SIM.
Payment request response from SIM relay to network.
Payment receipt response from Network.
Payment Screen Options Menu.
Payments Options Menu.

Payment Request Message

A simple method for a GSM mobile phone would be to receive the payment request as a specially tagged SMS message.

The payment request message may simply be passed directly to the SIM module.

Phone Initiated Payment

The payer device could be used to initiate payment to a specific person or business. A simple way of selecting the person to pay would be a phone number.

This method of payment is prone to error—with the possibility of paying the wrong person. For this reason it is suggested (but not necessary) for the number paid to be an existing entry in the phone book stored on the phone.

Entry of an amount as one the payment screen
Options from the Payment Screen
  Select account.
  Relay.
Payment Menu from Device Idle
  Default account.
  View Transactions.
  Initiate payment.
Payment Device Types and Technology
Adaptive System for Using 'Paired' Communications Improved Local Wireless Communication is proposed for local wireless communication. Local wireless communication such as Bluetooth can occur either between devices already known to each other or between devices not preset to talk to each other. It is preferable where possible to restrict communication to devices which have been previously identified to each other in a process know as 'pairing'. Each device has a unique network ID to enable pairing.

Since payer devices are used at points of payment at a variety of locations and often on an ad hoc basis, it would appear initially that paired communication is not possible.

This can be overcome using the short range communication used to initiate a transaction. For each payer device a 'phantom' point of payment Bluetooth device with a unique identity can be issued. The payer device can be paired to this point of payment. However in place of an actual point of payment being provided as the actual paired device—the network identifier is simply reserved and recorded on the contactless smart card. When an actual point of payment detects the smart card for a payer device, the local wireless communications of point of payment reads the required network identifier from the contactless card and adopts that identity. In this manner the point of payment becomes the paired device for the payer device.

New Payment Points
Restaurant Wallet

An electronic point of payment can be made in the form of a restaurant wallet as used to present the amount payable to customers or in the form of payment receptacle as in normal use in the restaurant. Currently, customers either insert their credit card or the required cash as payment. Where card payment is offered, restaurant staff must go through additional steps and the customer must wait. Both staff and customer are inconvenienced. By using a payer device and having an electronic point of payment inbuilt into the payment receptacle, customers may make their own payment with out waiting and may spilt payment amongst themselves without the complication of requiring assistance from restaurant staff. Both customer and restaurant staff benefit.

Further details of the system according to the exemplary embodiment:

| Sample Screens |
| --- |
| Pay: Meter |
| $2.20 |
| for 20 mins |
| Pay: Food |
| $50:70 |
| 15%tip |
| **** |
| pay: |
| DJs books |
| $29.95 |

| Sample Screens |
| --- |
| **** ←------PIN ENTRY |

Payment Request
  This message is to be sent to the phone from the network:

| Fields | |
| --- | --- |
| FIELD | USE |
| Amount | The amount to be paid - or, for unit payments - the unit price. |
| Payto text | Text representation of the business or person to be paid. |
| Payto # | Phone number of the business or person to be paid. |
| Unit Text | Up to 4 characters specifying the unit for unit payments. |
| Minimum unit | Payment must match a number of these units. |
| Flag: allow increase | |
| Flag: allow decrease | |

Amount: the amount requested to be paid (or where relevant - the unit price).
Payto: text representation of the person or organisation to be paid.
Payto #: phone number of the person or organisation to be paid.
Unit text: up to three characters displaying the unit of the item to be purchased (blank if not relevant).
Minimum unit: 0 if not relevant.
Flag-vary up amount?: are tips relevant and can the amount be increased.
Flag-vary down amount?: can the amount be decreased.

Payment Transaction Flows

| STEP | EQUIPMENT | NOTES |
| --- | --- | --- |
| Existing Magnetic Card Transaction | | |
| Card Swipe | | |
| Amount Entry | | |
| Txn Send to bank | | |
| Bank launches verification | | See below "payment verification step" |
| Payment Verification Step | | |

Features of the system according to the exemplary embodiment:
  1. Payment verification using wireless device carried by consumer.
  2. Payment verification using secured wireless device carried by consumer.
  3. Payment verification for payments made in person using secured wireless device carried by consumer.
  4. Payment verification using secured wireless device carried by consumer with payment options available from device.
Contactless Card Initiation
  Payment verification using wireless device carried by consumer.
  Payment verification using secured wireless device carried by consumer.
  Payment verification for payments made in person using secured wireless device carried by consumer.
  Payment verification using secured wireless device carried by consumer with payment options available from device.
Wireless Device Carried by Consumer for Secure Verification of Transactions Initiated by:

Contactless smart card.
Magnetic style credit debit card.
Smart card credit debit card.
Combined magnetic/smart card debit/credit card.
Payment Features
   Pin entry mode on phone screen.
   Protected Payment command to SIM.
   Payment screen with % and unit options.
Gateway
   Communications Gateway Communications performing any of the three tasks described in Mobile Phone Communication Gateway.
   Adaptive system for Bluetooth or other 'paired' communications system.
   Point of payment with interface for payer device.
   the mobile phone by entry of a specific phone number followed by touch tones.
   Payment by mobile phone using voice communication to identify the payment point to be paid.

Modifications and variations as would be apparent to a skilled addressee are deemed to be within the scope of the present invention.

The invention claimed is:

1. A method of making a payment, comprising the steps of:
providing information associated with a payer, the information being provided in a manner so that a payee can access the information,
receiving information about the payment by a payer electronic device associated with the payer, and
giving instructions for making the payment using the electronic device associated with the payer;
wherein the information about the payment includes product information in the form of at least one product identifier of at least one product available from the payee, and the method includes the step of the payer electronic device selecting at least one product identifier, and wherein the payer electronic device is a computing device and the product identifier is in computer recognizable form, the payer electronic device being arranged to recognize and process the product identifier;
wherein the information about the payment further includes payment information including a payment amount for the at least one product and a payment identity of the payee, wherein the payer electronic device is arranged to enable recognition of the payment information and to formulate messages including the payment information and transmit those messages to a transaction processing system;
wherein the step of giving instructions for making the payment includes the step of the payer electronic device providing the payment amount, payment identity of the payee and the selected product identifier to the transaction processing system; the transaction processing system being arranged to access an account of the payer and make payment to the payee for the payment amount, and the transaction processing system transmitting the product identifier m the payee, wherein the payee receives information about the at least one product paid for by the payer electronic device to enable provision of the product to the payer.

2. A method in accordance with claim 1, comprising the further step of the transaction processing system transmitting confirmation that payment has been made to the payee.

3. A method in accordance with claim 1, wherein the payer electronic device includes a display, and further comprising the step of the payer electronic device being arranged to display on the display payment information.

4. A method in accordance with claim 1, including the further step of the payer electronic device varying the payment amount.

5. A method in accordance with claim 4, wherein the payer electronic device includes a user input device and the step of varying the payment amount includes the step of the user inputting via the input device a varied payment amount.

6. A method in accordance with claim 1, wherein the product information is included in a listing including the at least one product identifier.

7. A method in accordance with claim 6, wherein the listing includes a plurality of the product identifiers comprising a menu of products provided by the payee, whereby the payer electronic device may select one or more of the products.

8. A method in accordance with claim 6, wherein the listing is made available via a network for a payer to upload to the payer electronic device.

9. A method in accordance with claim 8, wherein the network is a wide area network, such as the Internet.

10. A method in accordance with claim 1, wherein the step of receiving information about the payment by the payer electronic device includes the step of receiving information about the payment from a passive device.

11. A method in accordance with claim 10, wherein the passive device is an optically readable device.

12. A method in accordance with claim 11, wherein the optically readable device is a barcode.

13. A method in accordance with claim 10, wherein the passive device is provided as part of an invoice.

14. A method in accordance with claim 10, wherein the passive device is provided with a product for sale.

15. A method in accordance with claim 10, wherein the information about the payment includes instructions for utilising an application to control the payer electronic device to provide instructions for making the payment.

16. A method in accordance with claim 15, wherein the information about the payment includes location information identifying a location where a payer electronic device can obtain the application for uploading to the payer electronic device.

17. A method in accordance with claim 1, wherein the step of receiving information about the payment comprises receiving the information from a payee electronic device associated with the payee.

18. A method in accordance with claim 17, wherein the information associated with the payer includes payer electronic device information enabling the payee electronic device to communicate with the payer electronic device.

19. A method in accordance with claim 18, wherein the payer electronic device information is provided by an access device associated with the payer electronic device.

20. A method in accordance with claim 19, wherein the access device is a smart card.

21. A method in accordance with claim 19, wherein the access device is integral with the payer electronic device.

22. A method in accordance with claim 18, wherein communication between the payee electronic device and the payer electronic device is via a local wireless network.

23. A method in accordance with claim 18, wherein communication between the payer and payee electronic device is via a telephone network.

24. A method in accordance with claim 23, wherein the telephone network includes a mobile telephone network.

25. A method in accordance with claim 1, wherein the instructions for making the payment axe transmitted directly from the payer electronic device to the transaction processing system.

26. A method in accordance with claim 1, wherein the instructions for making the payment are transmitted to the transaction processing system via a payee electronic device.

27. A method in accordance with claim 1, wherein the instructions for making the payment include a confirmation transmitted to a transaction processing system that the payment should proceed.

28. A method in accordance with claim 27, comprising the step of the confirmation being generated by the payer electronic device.

29. A method in accordance with claim 28, wherein the payer electronic device includes input device, and the step of generating the confirmation includes the step of requiring user input via the input device to enable the confirmation to be generated.

30. A method in accordance with claim 29, wherein the step of requiring is implemented by an application provided by the payer electronic device.

31. A method in accordance with claim 30, wherein the application is implemented within firmware in the payer electronic device.

32. A method in accordance with claim 29, wherein the payer electronic device includes a display, and the step of requiring requires the user to acknowledge via the input device information about the payment appearing on the display.

33. A method in accordance with claim 27, wherein the confirmation includes encoded information.

34. A method in accordance with claim 33, wherein the encoded information is a digital signature.

35. A method in accordance with claim 1, wherein the information associated with the payer includes an account identifier of an account of the payer.

36. A method in accordance with claim 35, wherein the account identifier is provided by the payer providing a card, such as a credit card.

37. A method in accordance with claim 36, wherein the account identifier is part of an account number, and wherein a transaction processing system stores the other part of the account number.

38. A method in accordance with claim 37, wherein the part account number is provided by the payer electronic device in encrypted form.

39. A method in accordance with claim 1, wherein the information about the payment includes one or more applications including instructions for controlling the payer electronic device to provide instructions for making the payment.

40. A method in accordance with claim 39, including the further step of uploading to the payer electronic device the one or more applications from a network.

41. A method is accordance with claim 1, wherein the information associated with the payer is a confirmation that payment has occurred.

42. A method in accordance with claim 1, wherein the information associated with the payer includes an identity of the payer.

43. A method in accordance with claim 1, wherein the step of giving instructions for making the payment include the payer electronic device pre-approving the payment before the payment transaction takes place, by providing pre-approval instructions to the transaction processing system.

44. A method in accordance with claim 1, wherein the payer electronic device is a portable device.

45. A method in accordance with claim 44, wherein the portable device is a palm-type computer.

46. A method in accordance with claim 44, wherein the portable device is a mobile telephone.

47. An apparatus for facilitating a payment transaction from a payer to a payee, comprising a payer electronic device associated with the payer, the payer electronic device including a payment information receiving device for receiving information about the payment, and payment instructing device for giving instructions for making the payment; wherein the information about the payment includes product information in the form of at least one product identifier of a product available from the payee, and the payer electronic device is arranged to enable selection of at least one product identifier, and wherein the payer electronic device is a computing device and the product identifier is in computer recognizable form, the payer electronic device being arranged to recognize and process the product identifier; wherein the information about the payment further includes payment information including a payment amount for the at least one selected product;

wherein the payment instructing device is arranged to provide the payment amount, payment identity of the payee and the selected product identifier to a transaction processing system, the transaction processing system being arranged to access an account of the payer and make payment to the payee for the payment amount, and the transaction processing system comprises a transmitting device that transmits the product identifier to the payee, wherein the payee receives information about the product ordered and paid for by the payer electronic device to enable provision of the product to the payer, and wherein the payer electronic device is arranged to enable recognition of the information about the payment and to formulate messages including the information about the payment and transmit those messages to a transactional processing system.

48. An apparatus in accordance with claim 47, wherein the transaction processing system is arranged to transmit confirmation that payment has been made to the payee.

49. An apparatus in accordance with claim 47, wherein the payer electronic device includes a display and is arranged to display payment information.

50. An apparatus in accordance with claim 47, wherein the payer electronic device includes an input device enabling the user to vary the payment amount.

51. An apparatus in accordance with claim 47, wherein the product information is in the form of a listing including a plurality of product identifiers from which the payer electronic device may select.

52. An apparatus in accordance with claim 47, wherein the payer electronic device is arranged to upload the product information from a database where the product information is available.

53. An apparatus in accordance with claim 47, wherein the payer electronic device includes a reading device arranged to read information about the payment from a passive device.

54. An apparatus in accordance with claim 53, wherein the passive device is an optically readable device and the reading device includes an optical reader.

55. An apparatus in accordance with claim 54, wherein the optically readable device is a barcode.

56. An apparatus in accordance with claim 54, wherein the reading device includes a camera.

57. An apparatus in accordance with claim 54, wherein the reading device is arranged to identify a passive device as providing information about the payment.

58. An apparatus in accordance with claim 47, the payer electronic device further including a communication device arranged to communicate with a payee electronic device.

59. An apparatus in accordance with claim 58, wherein the communication means includes device enabling communication via a local wireless network.

60. An apparatus in accordance with claim 58, the payer electronic device including an access device arranged to provide information to the payee electronic device to enable communication between the payee electronic device and the payer electronic device.

61. An apparatus in accordance with claim 60, wherein the access device is a smart card.

62. An apparatus in accordance with claim 60, wherein the access device is integral with the payer electronic device.

63. An apparatus in accordance with claim 58, wherein the payer electronic device includes a transmission device for transmitting the instructions for making the payment to the transaction processing system, the transmission device being arranged to transmit the instructions via the payee electronic device.

64. An apparatus in accordance with claim 47, the payer electronic device comprising remote transmission device being arranged to transmit the instructions for making the payment to a transaction processing system.

65. An apparatus in accordance with claim 64, wherein the remote transmission device is a transmitter arranged to transmit the signals via a mobile telephone network.

66. An apparatus in accordance with claim 47, wherein the instructions for making the payment include a confirmation transmitted to the transaction processing system that the payment should proceed, and the payment instructing device includes confirmation generation device for generating the confirmation.

67. An apparatus in accordance with claim 66, wherein the payer electronic device includes input device, and user input via the input device is required for the confirmation generation device to generate the confirmation.

68. An apparatus in accordance with claim 67, wherein the confirmation generation device is implemented partly or wholly by firm ware.

69. An apparatus in accordance with claim 67, wherein the payer electronic device includes a display and the confirmation generation means requires the user to acknowledge via the input means information about the payment appearing on the display, in order for it to generate a confirmation.

70. An apparatus in accordance with claim 67, wherein the confirmation generation means is arranged to generate a confirmation in the form of encoded information.

71. An apparatus in accordance with claim 70, wherein the encoded information is a digital signature.

72. An apparatus in accordance with claim 47, the payer electronic device including a storage device arranged to store at least one application including instructions for controlling the payment instructing means to give instructions for making the payment.

73. An apparatus in accordance with claim 72, the payer electronic device being arranged to upload the at least one application from a database.

74. An apparatus in accordance with claim 47, wherein the instructions for making the payment include an account identifier, identifying an account of the payer.

75. An apparatus in accordance with claim 74, wherein the account identifier includes a portion of an account number, and wherein the transaction processing system stores the other portion of the account number.

76. An apparatus in accordance with claim 47, wherein the instructions for making the payment includes a pre-approval, authorising payment for a subsequent payment transaction.

77. An electronic system comprising at least one processor and at least one memory device, the at least one memory device storing instructions, which when executed by the at least one processor, cause the at least one processor to:
provide information associated with a payer, the information being provided in a manner so that a payee can access the information;
receive information about the payment with a payer electronic device associated with the payer;
give instructions for making the payment using the electronic device associated with the payer;
wherein the information about the payment includes product information in the form of at least one product identifier of at least one product available from the payee, and wherein the payer electronic device is a computing device and the product identifier is in computer recognizable form the payer electronic device being arranged to recognize and process the product identifier;
select, with the payer electronic device, at least one product identifier;
wherein the information about the payment further includes payment information including a payment amount for the at least one product and a payment identity of the payee, wherein the payer electronic device is arranged to enable recognition of the payment information and to formulate messages including the payment information and transmit those messages to a transaction processing system;
wherein giving instructions for making the payment includes providing, with the payer electronic device, the payment amount, payment identity of the payee and the selected product identifier to the transaction processing system; the transaction processing system being arranged to access an account of the payer and make payment to the payee for the payment amount; and
transmit, with the transaction processing system, the product identifier to the payee, wherein the payee receives information about the at least one product paid for by the payer electronic device to enable provision of the product to the payer.

78. At least one non-transitory computer readable medium comprising data instructions stored therein, which when executed by at least one processor, cause the processor to:
provide information associated with a payer, the information being provided in a manner so that a payee can access the information;
receive information about the payment with a payer electronic device associated with the payer;
give instructions for making the payment using the electronic device associated with the payer;
wherein the information about the payment includes product information in the form of at least one product identifier of at least one product available from the payee, wherein the payer electronic device is a computing device and the product identifier is in computer recognizable form, the payer electronic device being arranged to recognized and process the product identifier,
select, with the payer electronic device, at least one product identifier;
wherein the information about the payment further includes payment information including a payment amount for the at least one product and a payment identity of the payee, wherein the payer electronic device is arranged to enable recognition of the payment information and to formulate messages including the payment information and transmit those messages to a transaction processing system;

wherein giving instructions for making the payment includes providing, with the payer electronic device, the payment amount, payment identity of the payee and the selected product identifier to the transaction processing system; the transaction processing system being arranged to access an account of the payer and make payment to the payee for the payment amount; and transmit, with the transaction processing system, the product identifier to the payee, wherein the payee receives information about the at least one product paid for by the payer electronic device to enable provision of the product to the payer.

\* \* \* \* \*